US012807025B2

(12) United States Patent
Kimura et al.

(10) Patent No.: US 12,807,025 B2
(45) Date of Patent: Nov. 24, 2026

(54) CHARGING SYSTEM, MANAGEMENT TERMINAL, VEHICLE, CHARGING METHOD, AND NON-TRANSITORY COMPUTER-READABLE RECORDING MEDIUM

(71) Applicant: Isuzu Motors Limited, Yokohama (JP)

(72) Inventors: Keisuke Kimura, Yokohama (JP); Shinya Ozaki, Yokohama (JP)

(73) Assignee: Isuzu Motors Limited, Yokohama (JP)

( * ) Notice: Subject to any disclaimer, the term of this patent is extended or adjusted under 35 U.S.C. 154(b) by 143 days.

(21) Appl. No.: 18/595,508

(22) Filed: Mar. 5, 2024

(65) Prior Publication Data

US 2024/0300367 A1 Sep. 12, 2024

(30) Foreign Application Priority Data

Mar. 7, 2023 (JP) ................................ 2023-034854

(51) Int. Cl.
*B60L 53/66* (2019.01)
*B60L 53/30* (2019.01)

(52) U.S. Cl.
CPC ............ *B60L 53/66* (2019.02); *B60L 53/305* (2019.02); *B60L 2250/16* (2013.01); *B60L 2260/58* (2013.01)

(58) Field of Classification Search
None
See application file for complete search history.

(56) References Cited

U.S. PATENT DOCUMENTS

2010/0217485 A1* 8/2010 Ichishi ................ H01M 10/441 701/36
2012/0169511 A1* 7/2012 Windstrup .............. B60L 53/64 340/870.02
2013/0110340 A1* 5/2013 Park ........................ B60L 53/14 320/109
2016/0047862 A1* 2/2016 Shimizu ............... G06Q 20/145 702/63
2018/0037136 A1* 2/2018 Nelson ................... G01C 21/00
2018/0170202 A1* 6/2018 Kim ...................... B60L 53/305
(Continued)

FOREIGN PATENT DOCUMENTS

JP 2011-239662 11/2011
JP 2013-090360 5/2013
(Continued)

*Primary Examiner* — Shayne M. Gilbertson

(57) ABSTRACT

A charging system, a management terminal, a vehicle, a charging method, and a non-transitory computer-readable recording medium capable of vehicles to be properly operated are provided. The charging system controls a plurality of vehicles and at least one charger that supplies charging power to the plurality of vehicles. The charging system includes a setting section that sets, for the plurality of vehicles, a charging plan indicating charging start times and charging end times and a control section that controls charging of a battery of each of the plurality of vehicles based on the charging plan. Even when one of the plurality of vehicles and the charger are connected to each other in a period for which the charging plan is set, the control section does not perform charging with the charging power supplied from the charger when present time is within a charging stop period in the charging plan.

19 Claims, 21 Drawing Sheets

(56) References Cited

U.S. PATENT DOCUMENTS

| | | | | |
|---|---|---|---|---|
| 2020/0156494 | A1* | 5/2020 | Niikawa | B60L 50/60 |
| 2021/0380012 | A1* | 12/2021 | Tsuda | G06Q 30/0283 |
| 2022/0048399 | A1 | 2/2022 | Nishita et al. | |
| 2023/0109375 | A1* | 4/2023 | Mallia | B60L 58/15<br>701/22 |
| 2024/0177544 | A1 | 5/2024 | Matsuda | |
| 2025/0033517 | A1* | 1/2025 | Hancock | B60L 53/66 |
| 2025/0128636 | A1* | 4/2025 | Raguse | B60L 53/62 |

FOREIGN PATENT DOCUMENTS

| | | |
|---|---|---|
| JP | 2015-186338 | 10/2015 |
| JP | 2018-106745 | 7/2018 |
| JP | 2018-182887 | 11/2018 |
| JP | 2021-129459 | 9/2021 |
| JP | 2022-118575 | 8/2022 |
| JP | 2022118575 A * | 8/2022 |
| WO | WO 2020/161773 | 8/2020 |
| WO | WO 2022/209343 | 10/2022 |

* cited by examiner

| VEHICLE IDENTIFICATION INFORMATION | (SCHEDULED) RETURN TIME | NEXT SCHEDULED DEPARTURE TIME | SCHEDULED WORK TIME (hrs) | TARGET LEVEL OF CHARGE (%) | AVAILABLE CHARGING START TIME |
|---|---|---|---|---|---|
| VEHICLE A (120a) | 17:00 | 6:00 | 2 | 100 | 22:00 |
| VEHICLE B (120b) | 17:30 | 7:00 | 1 | 80 | 22:00 |
| VEHICLE C (120c) | 22:00 | 7:00 | 1 | 80 | 22:00 |
| VEHICLE D (120d) | 16:00 | 7:00 | 1 | 70 | 22:00 |

FIG. 4A

| VEHICLE IDENTIFICATION INFORMATION | (SCHEDULED) RETURN TIME | NEXT SCHEDULED DEPARTURE TIME | SCHEDULED WORK TIME (hrs) | ESTIMATED OPERATION DISTANCE (km) | TARGET LEVEL OF CHARGE (%) |
|---|---|---|---|---|---|
| VEHICLE A (120a) | 17:00 | 6:00 | 2 | 100 | 100 |
| VEHICLE B (120b) | 17:30 | 7:00 | 1 | 50 | 80 |
| VEHICLE C (120c) | 22:00 | 7:00 | 1 | 50 | 80 |
| VEHICLE D (120d) | 16:00 | 7:00 | 1 | 40 | 70 |

FIG. 4B

| | | POWER USED BY FIXTURE | | |
|---|---|---|---|---|
| OUTSIDE TEMPERATURE (AVERAGE) | ESTIMATED TRAVEL DISTANCE | NONE | WORK | REFRIGERA-TION |
| <15℃ | ≦30km | 60% | 80% | 90% |
| | 30 km TO 50 km | 80% | 90% | 100% |
| | 50 km TO 70 km | 100% | 100% | 100% |
| | ≧70km | 100% | 100% | 100% |
| 15℃ TO 25℃ | ≦30km | 50% | 70% | 80% |
| | 30 km TO 50 km | 70% | 80% | 90% |
| | 50 km TO 70 km | 90% | 100% | 100% |
| | ≧70km | 100% | 100% | 100% |
| >25℃ | ≦30km | 60% | 80% | 90% |
| | 30 km TO 50 km | 80% | 90% | 100% |
| | 50 km TO 70 km | 100% | 100% | 100% |
| | ≧70km | 100% | 100% | 100% |

FIG. 4C

| | AVAILABLE CHARGING START TIME | SCHEDULED DEPARTURE TIME | TARGET LEVEL OF CHARGE | LATEST SOC | CHARGE AMOUNT | CHARGING RATE | CHARGING START TIME | CHARGING END TIME |
|---|---|---|---|---|---|---|---|---|
| TARGET VEHICLE A | 18:00 | 7:00 | 100%(100kWh) | 10%(50kWh) | 50kWh | 10kW | 18:00 | 3:00 |
| TARGET VEHICLE B | 18:00 | 7:00 | 100%(100kWh) | 20%(20kWh) | 80kWh | 10kW | 21:00 | 5:00 |
| TARGET VEHICLE C | 18:00 | 6:00 | 100%(100kWh) | 20%(60kWh) | 40kWh | 10kW | 3:00 | 11:00 |
| TARGET VEHICLE D | 18:00 | 7:00 | 100%(100kWh) | 10%(50kWh) | 50kWh | 10kW | 19:00 | 4:00 |
| TARGET VEHICLE E | 18:00 | 6:00 | 100%(100kWh) | 10%(20kWh) | 80kWh | 10kW | 20:00 | 5:00 |
| TARGET VEHICLE F | 18:00 | 7:00 | 100%(100kWh) | 20%(60kWh) | 40kWh | 10kW | 4:00 | 13:00 |

FIG. 8A

| | AVAILABLE CHARGING START TIME | SCHEDULED DEPARTURE TIME | TARGET LEVEL OF CHARGE | LATEST SOC | CHARGE AMOUNT | CHARGING RATE | CHARGING START TIME | CHARGING END TIME |
|---|---|---|---|---|---|---|---|---|
| TARGET VEHICLE A | 18:00 | 7:00 | 100%(100kWh) | 10%(50kWh) | 50kWh | 10kW | 18:00 | 3:00 |
| TARGET VEHICLE B | 18:00 | 7:00 | 100%(100kWh) | 20%(20kWh) | 80kWh | 10kW | 21:00 | 5:00 |
| TARGET VEHICLE C | 18:00 | 6:00 | 100%(100kWh) | 20%(60kWh) | 40kWh | 10kW | 3:00 | 11:00 |
| TARGET VEHICLE D | 18:00 | 7:00 | 100%(100kWh) | 10%(50kWh) | 50kWh | 10kW | 19:00 | 4:00 |
| TARGET VEHICLE E | 18:00 | 6:00 | 100%(100kWh) | 10%(20kWh) | 80kWh | 10kW | 20:00 | 5:00 |
| TARGET VEHICLE F | 18:00 | 7:00 | 100%(100kWh) | 20%(60kWh) | 40kWh | 10kW | 4:00 | 13:00 |

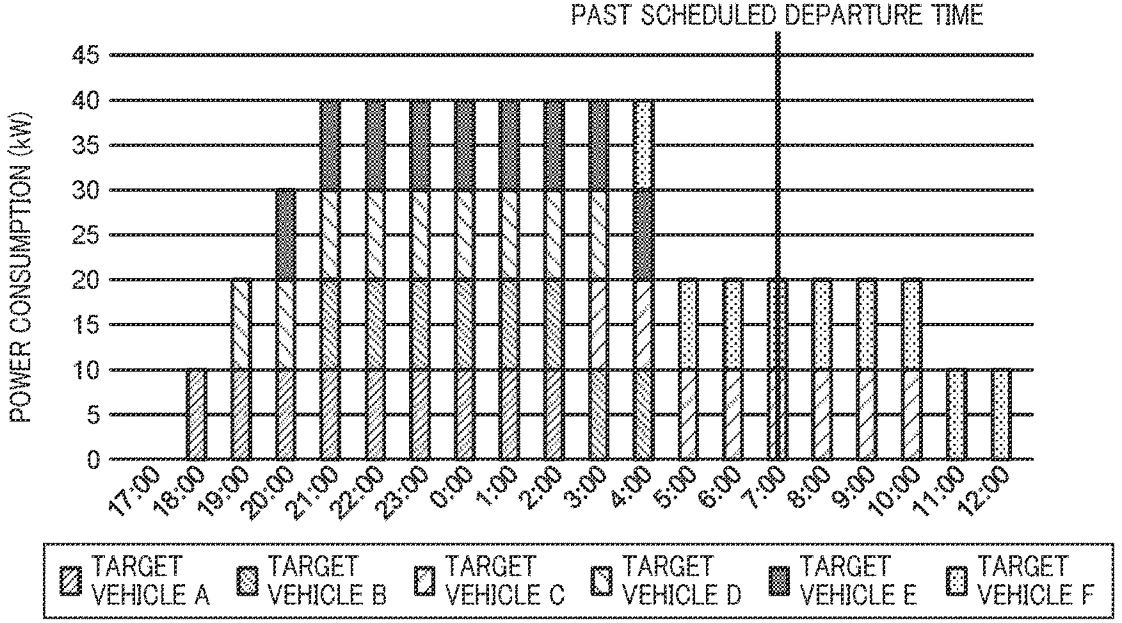

RETURN

FIG. 9B

CHARGING PLAN TABLE

| | AVAILABLE CHARGING START TIME | SCHEDULED DEPARTURE TIME | TARGET LEVEL OF CHARGE | LATEST SOC | CHARGE AMOUNT | CHARGING RATE | CHARGING START TIME | CHARGING END TIME |
|---|---|---|---|---|---|---|---|---|
| TARGET VEHICLE A | 18:00 | 7:00 | 100%(100kWh) | 50%(50kWh) | 50kWh | 10kW | 1:00 | 6:00 |
| TARGET VEHICLE B | 18:00 | 7:00 | 100%(100kWh) | 20%(20kWh) | 80kWh | 10kW | 18:00 | 2:00 |
| TARGET VEHICLE C | 18:00 | 7:00 | 100%(100kWh) | 60%(60kWh) | 40kWh | 10kW | 4:00 | 7:00 |

CHARGING SYSTEM, MANAGEMENT TERMINAL, VEHICLE, CHARGING METHOD, AND NON-TRANSITORY COMPUTER-READABLE RECORDING MEDIUM

CROSS REFERENCE TO RELATED APPLICATIONS

This application claims the benefit of priority of Japan Patent Application No. 2023-034854 filed on Mar. 7, 2023, the contents of which are incorporated by reference as if fully set forth herein in their entirety.

TECHNICAL FIELD

The present disclosure relates to a charging system, a management terminal, a vehicle, a charging method, and a non-transitory computer-readable recording medium.

BACKGROUND ART

During recent years, the need to protect natural environments and advances in rechargeable battery technologies have led to rapid progress in electrification of passenger cars and development of infrastructure for this purpose, including expansion of charging facilities and lower costs, which has extended to commercial vehicles as well. Unlike passenger cars, when commercial vehicles such as buses are charged, it is necessary to create charging plans based on power consumption forecasts that take into account operation routes, traffic congestion, and other factors that cause energy costs to fluctuate. In addition, since charging commercial vehicles requires a large amount of power, it is necessary to consider constraints on the amount of power supplied when charging a plurality of commercial vehicles, such as peak shifting that takes into account a relationship with contracted power. Various proposals have been made for charging plans and operation plans for commercial vehicles in consideration of these circumstances.

Japanese Patent Application Laid-Open No. 2018-106745, for example, discloses an operation management apparatus capable of creating an operation plan where a plurality of commercial vehicles operates without running out of electricity.

In addition, Japanese Patent Application Laid-Open No. 2022-118575, for example, discloses a charging plan creation apparatus including a plan creation section that determines, using an operation plan for commercial vehicles, charge amount of storage batteries in a plan creation target period and that creates a charging plan using the charge amount and maximum charging power set by a maximum power setting section.

The operation management apparatus described in Japanese Patent Application Laid-Open No. 2018-106745, which includes a charging plan for commercial vehicles such as buses, however, is inconvenient to be applied as is to commercial vehicles that deliver packages, such as trucks. This is because commercial vehicles that make deliveries have many matters to be considered that do not exist for passenger cars and buses, both during daytime operation hours and during nighttime charging hours.

In addition, the charging plan creation apparatus described in Japanese Patent Application Laid-Open No. 2022-118575 does not take sufficient care to ensure that commercial vehicles that make deliveries are properly operated and prepared for the operation during daytime operation hours and nighttime charging hours.

SUMMARY OF INVENTION

The present disclosure aims to provide a charging system, a management terminal, a vehicle, a charging method, and a non-transitory computer-readable recording medium capable of enabling commercial vehicles to be properly operated and prepared for the operation during daytime operation hours and nighttime charging hours.

In order to achieve the abovementioned object, a charging system in the present disclosure is a charging system that controls a plurality of vehicles and at least one charger that supplies a charging power to the plurality of vehicles, the charging system including: a setting section that sets, for the plurality of vehicles, a charging plan indicating a charging start time and a charging end time; and a control section that controls charging of a battery of each of the plurality of vehicles based on the charging plan, in which, even when at least one of the plurality of vehicles and the at least one charger are connected to each other in a period for which the charging plan is set, the control section does not perform charging with the charging power supplied from the at least one charger when present time is within a charging stop period in the charging plan.

In order to achieve the abovementioned object, a management terminal in the present disclosure is a terminal connectable to the charging system, the management terminal including: a function section that presents a scheduled departure time, a target level of charge, or a time for preparation work for at least one of the plurality of vehicles to the charging system or a function section that obtains, from the charging system, a charge amount of at least one of the plurality of vehicles or a scheduled connection time at which at least one of the plurality of vehicles is scheduled to be connected to the charging system, and a scheduled charging end time of at least one of the plurality of vehicles in the charging plan.

In order to achieve the abovementioned object, a vehicle in the present disclosure is connectable to the charging system and includes: a display section that displays a percentage of a charge amount with respect to a full charge or a percentage of the charge amount with respect to a target level of charge.

In order to achieve the abovementioned object, a charging method in the present disclosure is a method for controlling a plurality of vehicles and at least one charger that supplies a charging power to the plurality of vehicles, the charging method including: setting, for the plurality of vehicles, a charging plan indicating a charging start time and a charging end time; controlling charging of a battery of each of the plurality of vehicles based on the charging plan; and not performing, even when at least one of the plurality of vehicles and the at least one charger are connected to each other in a period for which the charging plan is set, charging with the charging power supplied from the charger when present time is within a charging stop period in the charging plan.

In order to achieve the abovementioned object, a non-transitory computer-readable recording medium in the present disclosure is a medium storing therein a program causing a computer to perform a process of controlling a plurality of vehicles and at least one charger that supplies a charging power to the plurality of vehicles, the process including: setting, for the plurality of vehicles, a charging plan indicating a charging start time and a charging end time;

controlling charging of a battery of each of the plurality of vehicles based on the charging plan; and not performing, even when at least one of the plurality of vehicles and the at least one charger are connected to each other in a period for which the charging plan is set, charging with the charging power supplied from the charger when present time is within a charging stop period in the charging plan.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention:

FIG. 4A is a schematic diagram illustrating an example of operation plan information input by a manager;

FIG. 4B is a schematic diagram illustrating an example of an operation plan information table at a time when a target level of charge is set from the operation plan information;

FIG. 4C is a schematic diagram illustrating an example of a relationship between an operation plan and a target level of charge;

FIG. 7A-1 is a time schedule table indicating an example of a charging plan set in a variation suppression mode;

FIG. 7A-2 is a time schedule table indicating an example of state of charge (SOC) set in the variation suppression mode;

FIG. 7B-1 is a time schedule table indicating an example of a charging plan set in the low-voltage charging mode, which is a comparative example;

FIG. 7B-2 is a time schedule table indicating an example of SOC set in the low-voltage charging mode, which is the comparative example;

FIG. 8A is a list indicating an example of a charging plan;

FIG. 9B is a time schedule table indicating the example of a charging plan displayed in an upper part of the operation screen and a time schedule table indicating the example of SOC in the charging plan displayed in a lower part of the operation screen;

DESCRIPTION OF EMBODIMENTS

Hereinafter, one or more embodiments of the present invention will be described with reference to the drawings. However, the scope of the invention is not limited to the disclosed embodiments.

An embodiment of the present disclosure will be described hereinafter with reference to the drawings.

Figure 1:
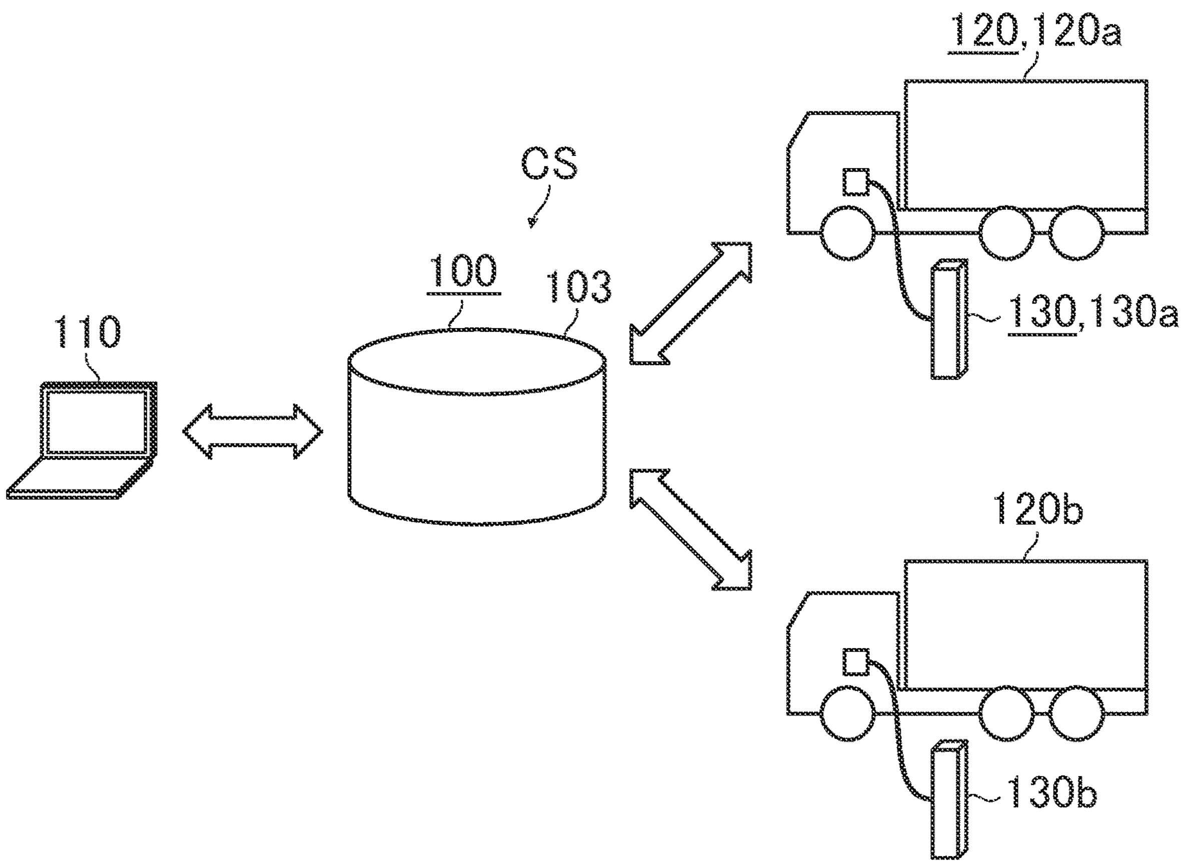
FIG. 1 is a diagram illustrating an overall configuration of a charging system according to an embodiment of the present disclosure.

FIG. 1 is a diagram illustrating an overall configuration of a charging system according to the embodiment of the present disclosure. Charging system CS illustrated in FIG. 1 includes management apparatus 100, terminal apparatus 110, vehicles 120, and chargers 130. Vehicles 120 are, for example, commercial vehicles that deliver packages, such as trucks, from a distribution center. Each vehicle 120 is an electric vehicle that includes battery 121 (secondary battery) and that supplies power to motor 122 for driving (refer to FIG. 3C) from battery 121. Each vehicle 120 is provided with loads 123 (refer to FIG. 3C) including a heater and a fixture to which battery 121 supplies power. Chargers 130 (external power supplies) can be connected to batteries 121 provided for vehicles 120 and charge connected batteries 121.

Chargers 130 are installed, for example, at the distribution center. The number of chargers 130 installed at the distribution center corresponds to the number of vehicles 120 to be charged. FIG. 1 illustrates charger 130*a* corresponding to vehicle 120*a* and charger 130*b* corresponding to vehicle 120*b*. Chargers 130 are known charging stations, for example, and description thereof is omitted. In the following description, a vehicle to be charged will be referred to as a "target vehicle" or simply as a "vehicle". Connecting a battery included in a vehicle and a charger to each other will be simply referred to as "connecting a vehicle and a charger to each other".

Figure 2:
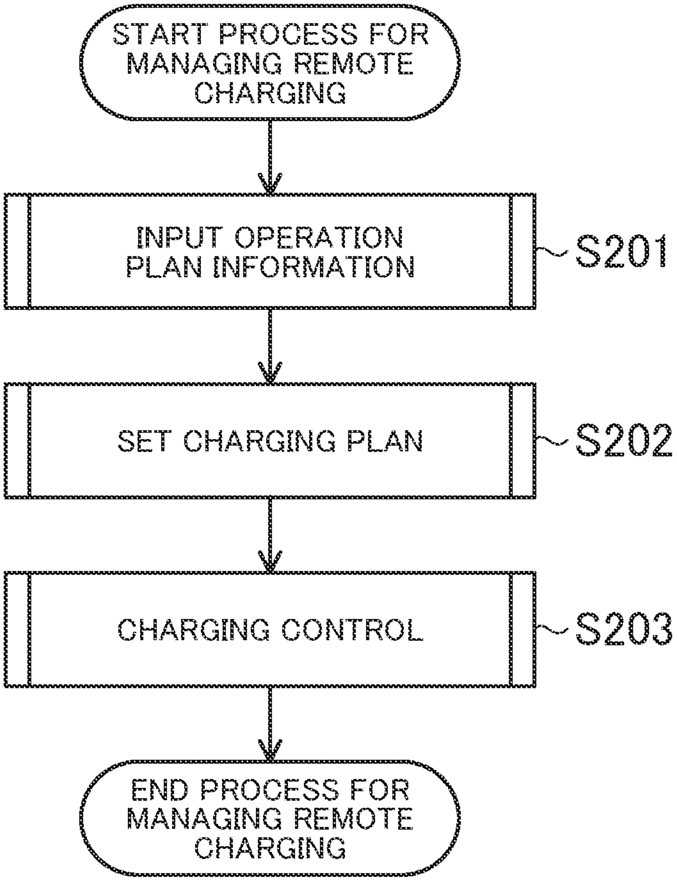
FIG. 2 is a flowchart illustrating an example of remote charging management in the charging system according to the embodiment.

Charging system CS illustrated in FIG. 1 is a system that sets a charging plan on the basis of operation plan information and that remotely controls charging from chargers 130 to batteries 121 in accordance with the set charging plan. FIG. 2 is a flowchart illustrating a procedure of remote charging management. In the remote charging management illustrated in FIG. 2, operation plan information regarding vehicles 120 is input in step S201, a charging plan is set using the input operation plan information in step S202, and charging control is performed on the basis of the set charging plan in step S203. In the following description, a charging plan will also be referred to as a "charging schedule" or simply as a "schedule". Although steps S201, S202, and S203 are sequentially performed in the above description, these steps may be performed temporally discontinuously, instead.

<Terminal Apparatus 110>

Terminal apparatus 110 is a mobile information terminal such as a laptop computer or a tablet terminal and inputs operation plan information. Terminal apparatus 110 corresponds to a "management terminal" in the present disclosure. Terminal apparatus 110 transmits operation plan information to management apparatus 100 over a network such as the Internet.

Figure 3A:
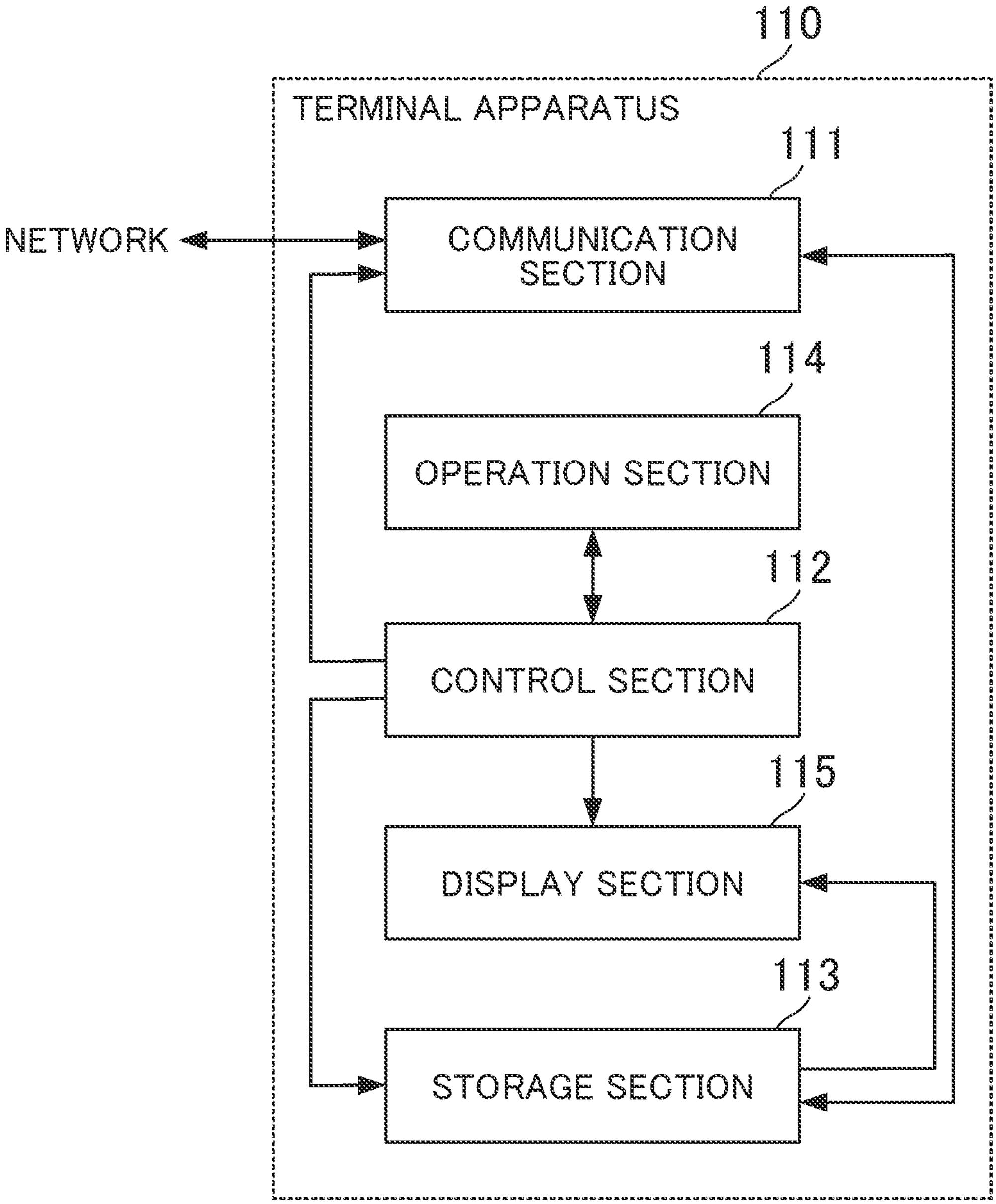
FIG. 3A illustrates functional blocks indicating functions of a terminal apparatus included in the charging system according to the embodiment of the present disclosure.

FIG. 3A illustrates functional blocks indicating functions of terminal apparatus 110. Terminal apparatus 110 functions as communication section 111, control section 112, storage section 113, operation section 114, and display section 115. In FIG. 3A, arrows indicate main data flow, and there may be another data flow that is not illustrated in FIG. 3A.

(Communication Section 111)

Communication section 111 has a communication function for connecting to the network. Communication section 111 transmits and receives various pieces of information to and from management apparatus 100 over the network. The various pieces of information include, for example, operation plan information and charging plan information.

(Operation Section 114)

Operation section 114 is, for example, an input apparatus such as a keyboard, a mouse, or a touchpad. An operation manager (hereinafter simply referred to as a "manager") inputs operation plan information using operation section 114. Operation section 114 corresponds to a "reception section" in the present disclosure.

FIG. 4A is a schematic diagram illustrating an example of the operation plan information input by the manager. The operation plan information illustrated in FIG. 4A is operation plan information regarding vehicle A (120*a*), vehicle B (120*b*), vehicle C (120*c*), and vehicle D (120*d*). The operation plan information includes (scheduled) return times, next scheduled departure times, scheduled work time (hrs), a target level of charge (%), and available charging start times. The target level of charge (%) is set on the basis of the operation plan information other than the target level of charge. The operation plan information illustrated in FIG. 4A is reference information that serves as a reference when management apparatus 100 sets a charging plan. The operation plan information, therefore, may include planned travel routes, estimated travel distances (estimated operation distances), estimated travel time, and cargo details, as well as the (scheduled) return times.

The (scheduled) return times of vehicle A, vehicle B, vehicle C, and vehicle D are 17:00, 17:30, 22:00, and 16:00, respectively. The next scheduled departure times of vehicle A, vehicle B, vehicle C, and vehicle D are 6:00, 7:00, 7:00, and 7:00, respectively. The scheduled work time (hrs) of vehicle A, vehicle B, vehicle C, and vehicle D is 2, 1, 1, and 1, respectively.

The target levels of charge (%) of vehicle A, vehicle B, vehicle C, and vehicle D are 100, 80, 80, and 70, respectively. The available charging start times of vehicle A, vehicle B, vehicle C, and vehicle D are 22:00, 22:00, 22:00, and 22:00, respectively.

FIG. 4B is a schematic diagram illustrating another example of the operation plan information table. The operation plan information illustrated in FIG. 4B includes, as with the operation plan information illustrated in FIG. 4A, (scheduled) return times, next scheduled departure times, scheduled work time (hrs), and available charging start times. The operation plan information illustrated in FIG. 4B also includes estimated travel distances (km). The estimated operation distances of vehicle A, vehicle B, vehicle C, and vehicle D are 100, 50, 50, and 40, respectively. The values in FIGS. 4A and 4B are examples, and it is needless to say that other values may be used and the operation manager or another person may set any values.

(Storage Section 113)

Storage section 113 includes a read-only memory (ROM) storing a basic input/output system (BIOS) of the computer that achieves terminal apparatus 110 and the like, a random-access memory (RAM) that serves as a work area of terminal apparatus 110, and a hard disk drive (HDD) storing an operating system (OS), application programs, and data to be referred to when the application programs are executed.

(Display Section 115)

Display section 115 is, for example, a liquid crystal display and an organic electroluminescent (EL) display. Display section 115 displays operation plan information input from operation section 114. Display section 115 may be provided outside terminal apparatus 110 as an apparatus separate from terminal apparatus 110. For example, terminal apparatus 110 may be a desktop computer and include an external monitor as display section 115. In this case, terminal apparatus 110 includes, instead of display section 115, a display control section that displays images on external display section 115. Alternatively, when terminal apparatus 110 is a laptop computer, for example, an external monitor may be included as display section 115 connected to the laptop computer.

(Control Section 112)

Control section 112 is a processor of terminal apparatus 110, such as a central processing unit (CPU) or a graphics processing unit (GPU), and executes the application programs stored in storage section 113. Control section 112 stores operation plan information input from operation section 114 in storage section 113 by executing an application program. Control section 112 displays the operation plan information on display section 115. Control section 112 controls communication section 111 in such a way as to transmit the operation plan information to management apparatus 100.

<Management Apparatus 100>

Next, configuration of management apparatus 100 will be described with reference to FIG. 3B.

Management apparatus 100 sets a charging plan on the basis of operation plan information transmitted from terminal apparatus 110. Management apparatus 100 is a server that provides services and functions between terminal apparatus 110 and vehicles 120. When terminal apparatus 110 or the like makes a request to management apparatus 100 using a uniform resource locator (URL), management apparatus 100 transmits data corresponding to the URL to terminal apparatus 110 or the like as a response.

Management apparatus 100 may be achieved by a single apparatus (server) or a plurality of apparatuses (servers). The plurality of servers includes a webserver, an application server, and a database server. The webserver is, for example, a server that returns, to terminal apparatus 110 or the like, a result corresponding to a request. The application server is a server that executes an application in response to a request received from the webserver and returns a processing result to the webserver. When data needs to be accessed, a request is given to the database server. The database server is a server that reads and writes data from and to a database in response to a request from the application server and returns necessary data to the application server. FIG. 1 illustrates storage section 103, which is the database. In the following description, management apparatus 100 will also be referred to as a "server".

Figure 3B:
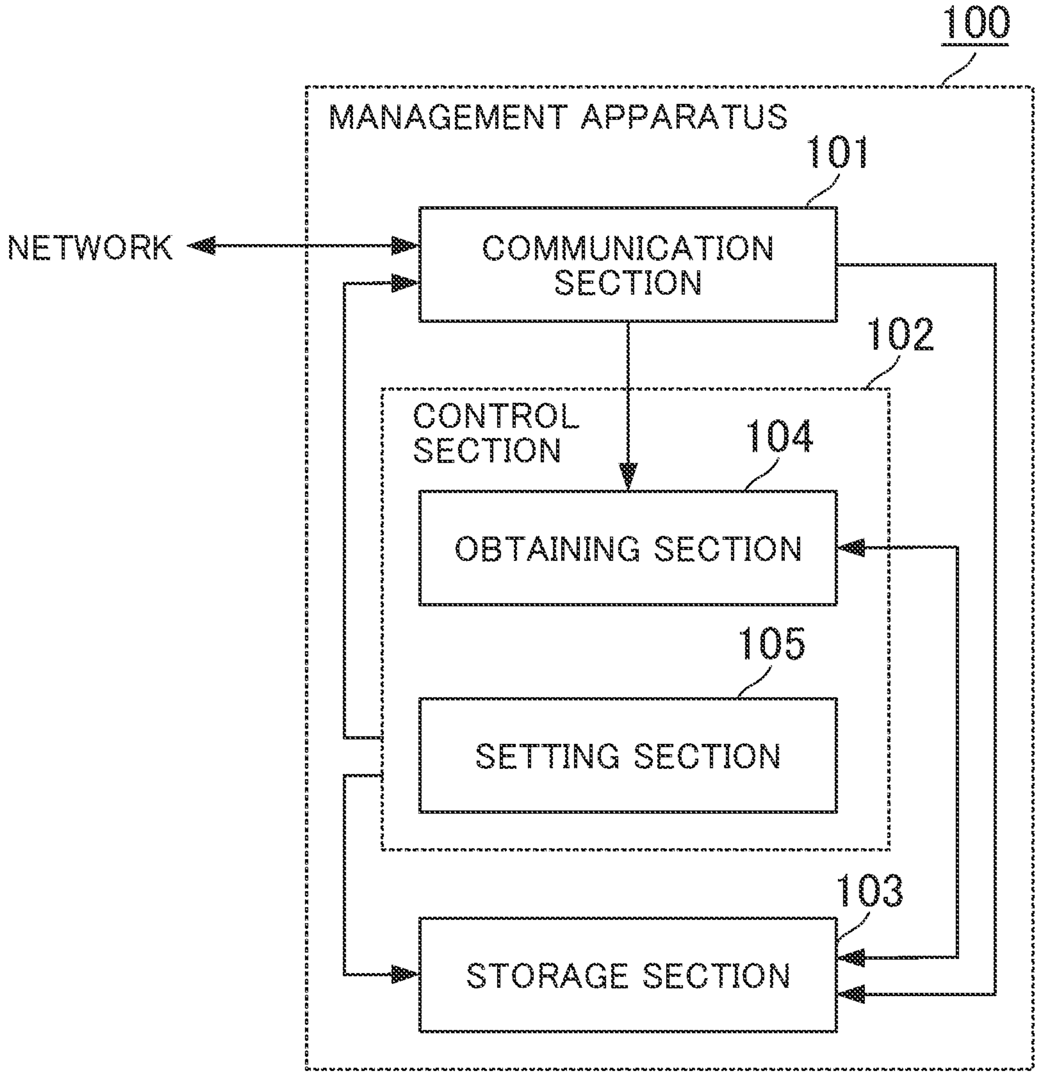
FIG. 3B illustrates functional blocks indicating functions of a management apparatus included in the charging system according to the embodiment of the present disclosure.

FIG. 3B illustrates functional blocks indicating functions of management apparatus 100 (server). Management apparatus 100 functions as communication section 101, control section 102, and storage section 103. In FIG. 3B, arrows indicate main data flow, and there may be another data flow that is not illustrated in FIG. 3B. In FIG. 3B, each functional block indicates not a component in units of hardware (apparatuses) but a component in units of functions. The functional blocks illustrated in FIG. 3B, therefore, may be implemented in a single apparatus (server) or a plurality of apparatuses. Communication of data between the functional blocks may be performed through any means such as a data bus.

(Communication Section 101)

Communication section 101 has, for example, a communication function for connecting to an external network such as the Internet. Communication section 101 transmits and receives various pieces of information to and from terminal apparatus 110 and vehicles 120 over the network. The various pieces of information include operation plan information. Operation plan information transmitted from terminal apparatus 110 is stored in storage section 103.

(Storage Section 103)

Storage section 103 stores a database (refer to FIG. 1) from which various pieces of information can be read and to which various pieces of information can be written. The database is achieved by one or a plurality of HDDs, solid-state drives (SSDs), or the like.

Storage section 103 includes a ROM storing a BIOS of the computer that achieves management apparatus 100 and the like, a RAM that serves as a work area of management apparatus 100, and an HDD storing an OS, application programs, and data to be referred to when the application programs are executed.

Storage section 103 stores relationship information indicating a relationship between an operation plan and a target level of charge. FIG. 4C is a schematic diagram illustrating an example of the relationship between an operation plan and a target level of charge. Relationship information illustrated in FIG. 4C is classified by outside temperature (average), estimated travel distance (km), and type of vehicle 120. In FIG. 4C, a type "none" is given to vehicles 120 for which no fixture is provided, a type "work" is given to work vehicles for which a fixture is provided, and a type "refrigeration" is given to vehicles for which refrigeration equipment is provided.

As illustrated in FIG. 4C, when the outside temperature (average) is lower than 15° C. (<15° C.) and the estimated travel distance is 30 km or shorter (≤30 km), power usage (target levels of charge) of "none", "work", and "refrigeration" is 60%, 80%, and 90%, respectively. When the estimated travel distance is longer than 30 km and shorter than 50 km (30 to 50 km), the power usage (target levels of charge) of "none", "work", and "refrigeration" is 80%, 90%, and 100%, respectively. When the estimated travel distance is 50 km or longer and shorter than 70 km (50 to 70 km), the power usage (target levels of charge) of "none", "work", and "refrigeration" is 100%, 100%, and 100%, respectively. When the estimated travel distance is 70 km or longer (≥70 km), the power usage (target levels of charge) of "none", "work", and "refrigeration" is 100%, 100%, and 100%, respectively.

As illustrated in FIG. 4C, when the outside temperature (average) is 15° C. or higher and 25° C. or lower (15° C. to 25° C.) and the estimated travel distance is 30 km or shorter (≤30 km), the power usage (target levels of charge) of "none", "work", and "refrigeration" is 50%, 70%, and 80%, respectively. When the estimated travel distance is longer than 30 km and shorter than 50 km (30 to 50 km), the power usage (target levels of charge) of "none", "work", and "refrigeration" is 70%, 80%, and 90%, respectively. When the estimated travel distance is 50 km or longer and shorter than 70 km (50 to 70 km), the power usage (target levels of charge) of "none", "work", and "refrigeration" is 90%, 100%, and 100%, respectively. When the estimated travel distance is 70 km or longer (≥70 km), the power usage (target levels of charge) of "none", "work", and "refrigeration" is 100%, 100%, and 100%, respectively.

As illustrated in FIG. 4C, when the outside temperature (average) exceeds 25° C. and the estimated travel distance is 30 km or shorter (≤30 km), the power usage (target levels of charge) of "none", "work", and "refrigeration" is 60%, 80%, and 90%, respectively. When the estimated travel distance is longer than 30 km and shorter than 50 km (30 to 50 km), the power usage (target levels of charge) of "none", "work", and "refrigeration" is 80%, 90%, and 100%, respectively. When the estimated travel distance is 50 km or longer and shorter than 70 km (50 to 70 km), the power usage (target levels of charge) of "none", "work", and "refrigeration" is 100%, 100%, and 100%, respectively. When the estimated travel distance is 70 km or longer (≥70 km), the power usage (target levels of charge) of "none", "work", and "refrigeration" is 100%, 100%, and 100%, respectively. As can be seen from the relationship information illustrated in FIG. 4C, the target level of charge increases as the estimated travel distance increases. The target level of charge also increases as power used by a fixture increases. When the outside temperature is lower or higher than a certain temperature range, power consumption of an air conditioner increases, resulting in a larger target level of charge. Here, the certain temperature range corresponds to so-called "moderate temperature", at which little or no air conditioning is used. In any case, the power usage becomes 100% beyond a certain threshold in consideration of ensuring a certain margin. The target level of charge, therefore, is set on the basis of the estimated travel distance, the power used by a fixture, the outside temperature, and the certain margin.

(Control Section 102)

Control section 102 is a processor, such as a CPU or a GPU, in management apparatus 100 and functions as obtaining section 104 and setting section 105 by executing an application program stored in storage section 103. Management apparatus 100 illustrated in FIG. 3B is an example at a time when management apparatus 100 is achieved by a single apparatus. Management apparatus 100, however, may be achieved by, for example, a plurality of calculation resources such as processors and memories, instead. In this case, the components of control section 102 are achieved when at least one of the plurality of different processors executes a program.

(Obtaining Section 104)

Obtaining section 104 obtains the operation plan information illustrated in FIG. 4B and the relationship information illustrated in FIG. 4C, both of which are stored in storage section 103.

(Setting Section 105)

Setting section 105 sets a charging plan (schedule) on the basis of charging parameters, SOC, and operation plan information (a target level of charge, a scheduled departure time, scheduled work time). Here, the charging parameters include an available charging start time, charging equipment information, and contracted power. The SOC will also be referred to as "remaining charge" or a "level of charge".

Figure 5:
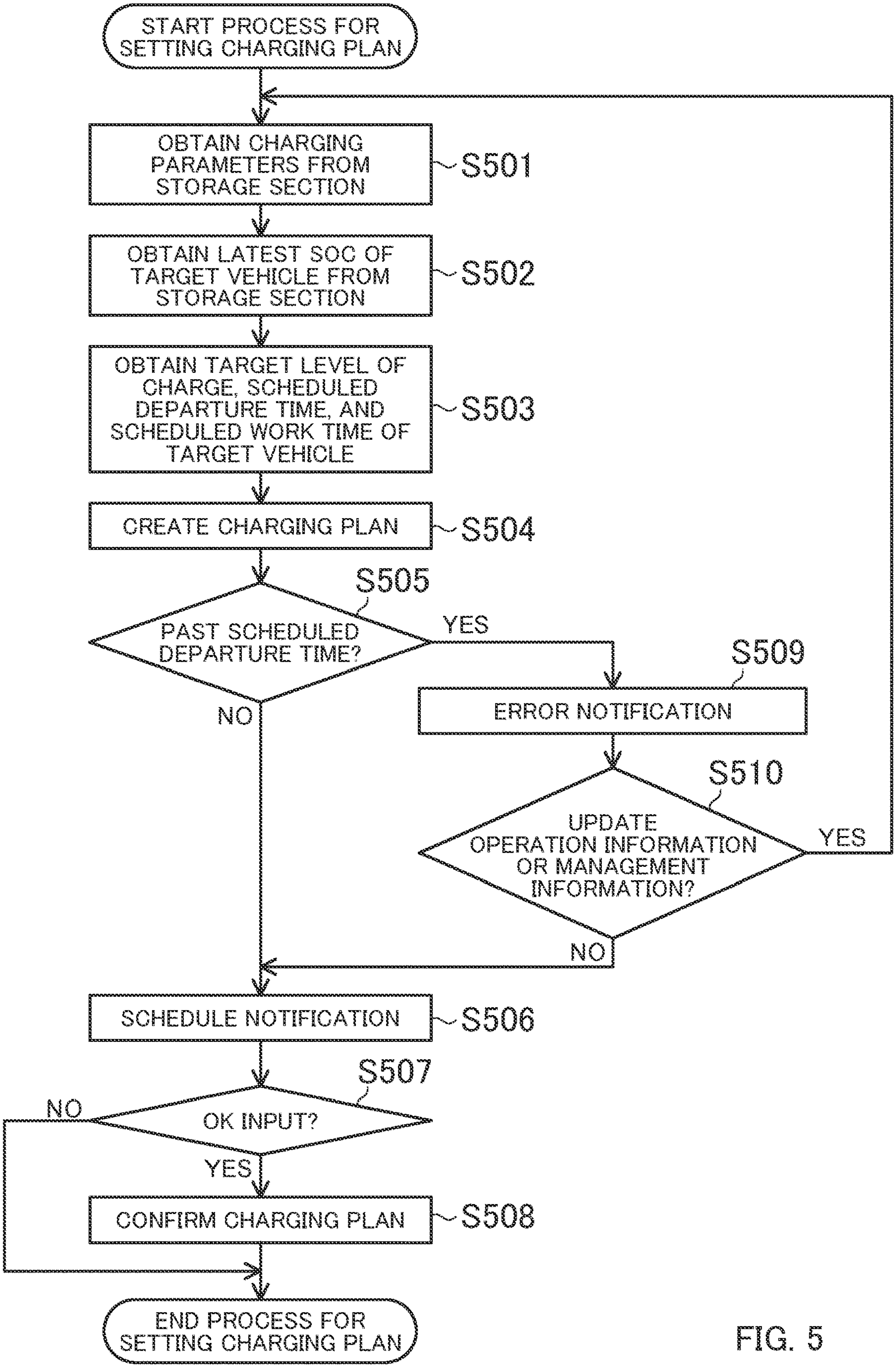
FIG. 5 is a flowchart illustrating an example of a process for setting a charging plan.

FIG. 5 is a flowchart illustrating an example of a process for setting a charging plan. The process illustrated in FIG. 5 starts in response to an instruction to execute an application program. It is assumed in the following description that the CPU of management apparatus 100 executes the function of setting section 105. The charging parameters, the SOC (remaining charge), and the operation plan information are stored in storage section 103 in advance.

First, in step S501, the CPU obtains charging parameters from storage section 103.

Next, in step S502, the CPU obtains latest SOC of a target vehicle from the storage section 103.

Next, in step S503, the CPU obtains a target level of charge, a scheduled departure time, and scheduled work time, which are operation plan information, from storage section 103.

Next, in step S504, the CPU creates a charging plan.

Next, in step S505, the CPU determines whether a departure time is later than the scheduled departure time. When the departure time is later than the scheduled departure time (YES in step S505), the process proceeds to step S509. When the departure time is not later than the scheduled departure time (NO in step S505), the process proceeds to step S506.

In step S506, the CPU displays the charging plan on display section 115. As a result, the manager is notified of the charging plan (schedule notification). The manager can check the charging plan. The charging plan may be displayed on a display section (not illustrated) of management apparatus 100.

Next, in step S507, the CPU determines whether there has been an OK input. When there has been an OK input (YES in step S507), the process proceeds to step S508. When there has not been an OK input (NO in step S507), this processing flow ends.

In step S508, the CPU confirms the charging plan. This process then ends.

In step S509, the CPU displays, on display section 115, information (error information) indicating a vehicle that cannot be charged to the target level of charge by the scheduled departure time of the vehicle. As a result, the manager is notified of the error information (error notification).

In step S510, the CPU determines whether to update an operation plan or the target level of charge. When the operation plan or the target level of charge is to be updated (YES in step S510), the process returns to step S501. As a result, the CPU revises the charging plan on the basis of the updated operation plan or target level of charge. When the operation plan or the target level of charge is not to be updated (NO in step S510), the process proceeds to step S506.

<Details of Setting of Charging Plan>

Next, details of the setting of a charging plan will be described.

The CPU calculates an amount of power necessary to charge vehicle 120 (necessary amount of power) from a target level of charge and remaining charge (SOC) (step S1).

The CPU calculates necessary charging time by dividing the necessary amount of power by charging power of corresponding charger 130 (refer to FIG. 1) (step S2). The charging power of charger 130 refers to power that can be charged by charger 130 in unit time.

The CPU adds up the necessary charging time and scheduled work time and stores resultant total time as time necessary to complete charging of vehicle 120 (step S3).

The CPU performs the process from step S1 to step S3 for each vehicle 120.

The CPU sets charging times of the plurality of vehicles 120 in accordance with a mode for setting a charging plan (described later) (step S4).

When a time when the total time has elapsed since an available charging start time is later than a scheduled departure time, the CPU sets an error flag (step S5). When an error flag is set, it is determined in the above-described step S505 that the departure time is later than the scheduled departure time.

<Fastest Charging Mode, Low-Voltage Charging Mode, and Variation Suppression Mode>

The CPU (setting section 105) of management apparatus 100 sets a charging plan in the above-described manner on the basis of charging parameters, SOC, and operation plan information. As indicated by step S4, the CPU sets the charging plan in accordance with the mode for setting a charging plan.

The manager may select a method for setting a charging plan from one of a plurality of modes (preferred mode) in advance. The present disclosure is not limited to this, and the manager may select a desired one of charging plans set in each of the plurality of modes.

In the present embodiment, the plurality of modes includes a “fastest charging mode”, a “low-voltage charging mode”, and a “variation suppression mode”.

In the fastest charging mode, charging periods are set such that all vehicles will be charged to a target level of charge as fast as possible. The fastest charging mode is a mode in which charging periods are set in such a way as to come as early as possible with total charging power in unit time being smaller than or equal to a threshold.

The low-voltage charging mode is a mode in which charging periods are set such that the total charging power in unit time becomes as small as possible in a period until completion of charging.

In the variation suppression mode, charging is switched such that variation in the SOC between target vehicles becomes small (variation between the vehicles is suppressed and differences in charge amount between the vehicles are reduced even when departure times become earlier). The present disclosure is not limited to this, and charging periods may be set while giving priority to particular ones of the plurality of vehicles in consideration of characteristics of individual vehicles (such that charging will be completed earlier).

Next, charging periods set for target vehicles A, B, and C when each of the plurality of modes is selected as the preferred mode will be described with reference to FIGS. 6A, 6B, and 7A-1. It is assumed that a threshold for the total charging power in unit time is 30 kW. A target level of charge of target vehicle A is 50 kWh, a target level of charge of target vehicle B is 80 kWh, and a target level of charge of target vehicle C is 30 kWh. In FIGS. 6A to 7A-1, horizontal axes represent time, and vertical axes represent power consumption (kW). Left-inclined hatching indicates times of charging and power consumption of target vehicle A. Right-inclined hatching indicates times of charging and power consumption of target vehicle B. Left-inclined, sparse hatching indicates times of charging and power consumption of target vehicle C. In order to simplify description, it is assumed that the target levels of charge and scheduled departure times set for target vehicles A, B, and C are all 100% and 6:00, respectively. It is also assumed that charge amount (SOC) of batteries of target vehicles A, B, and C before the charging are 50%, 20%, and 60%, respectively.

(Fastest Charging Mode)

Figure 6A:
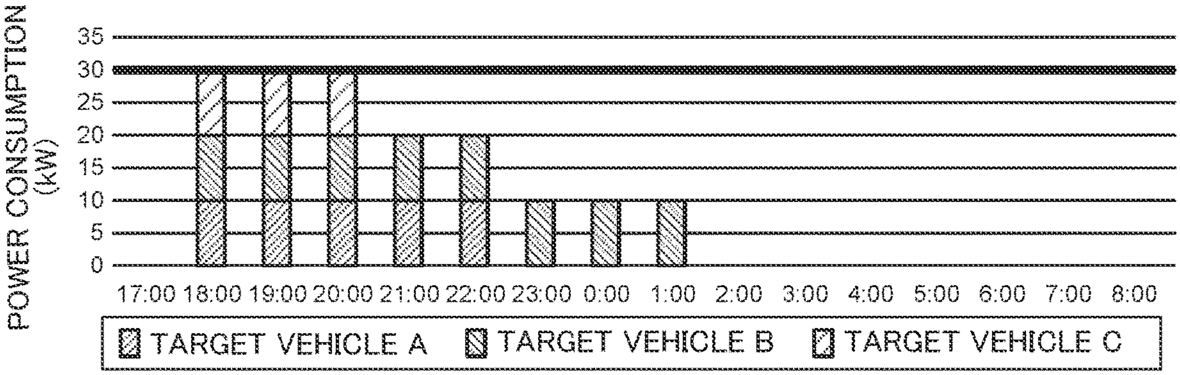
FIG. 6A is a time schedule table indicating an example of a charging plan set in a fastest charging mode.

FIG. 6A is a time schedule table indicating an example of a charging plan set in the fastest charging mode. As illustrated in FIG. 6A, when the fastest charging mode is selected as the preferred mode, a charging period taken to complete charging of all the vehicles to the target levels of charge as fast as possible is 8 hours. In the charging period (8 hours), there is a period of time where the total charging power in unit time reaches the threshold of 30 kW. In FIG. 6A, a solid line at a position of power consumption of 30 kW indicates the threshold.

(Low-Voltage Charging Mode)

Figure 6B:
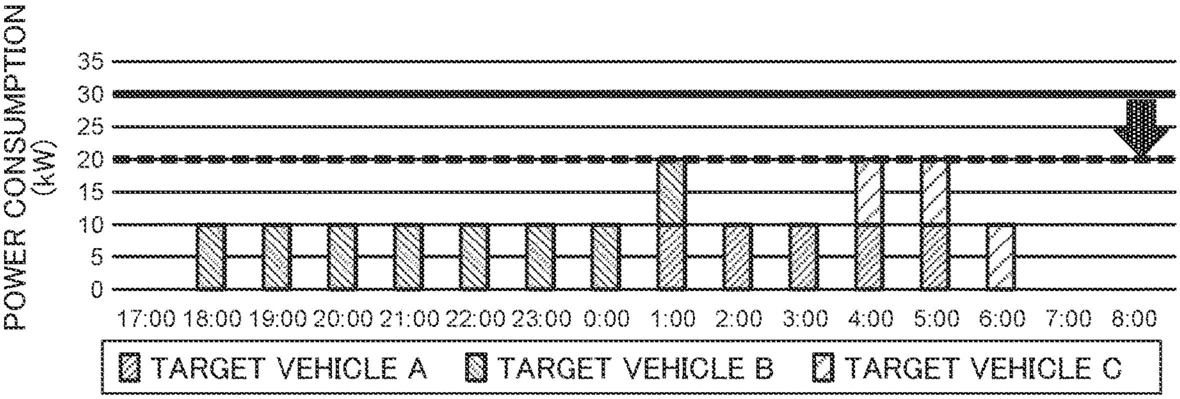
FIG. 6B is a time schedule table indicating an example of a charging plan set in a low-voltage charging mode.

FIG. 6B is a time schedule table indicating an example of a charging plan set in the low-voltage charging mode. As illustrated in FIG. 6B, when the low-voltage charging mode is selected as the preferred mode, the total charging power in unit time can be suppressed to 20 kW. A charging period taken to complete charging of all the vehicles to the target levels of charge as fast as possible is 13 hours. In FIG. 6B, a solid line at the position of power consumption of 30 kW indicates the threshold. A broken line at a position of power consumption of 20 kW indicates the total charging power.

(Variation Suppression Mode)

Figures 1, 7A:
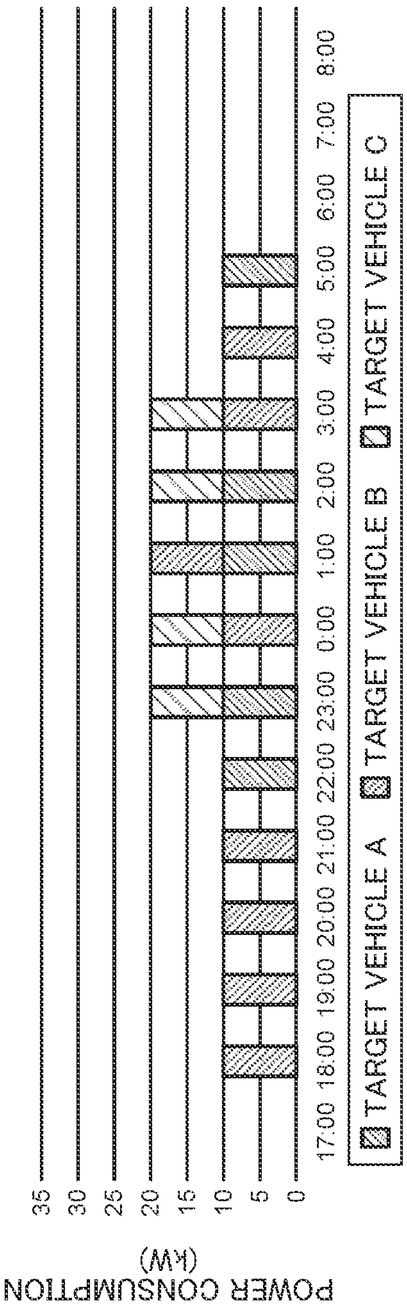
Figures 2, 7A:
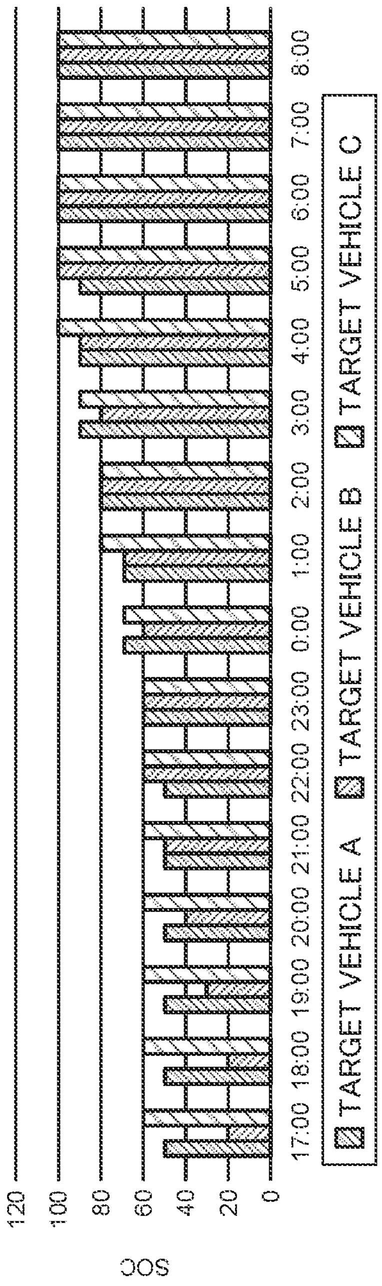

FIG. 7A-1 is a time schedule table indicating an example of a charging plan set in the variation suppression mode. As illustrated in FIG. 7A-1, when the variation suppression mode is selected as the preferred mode, charging of target vehicles B and C to the target levels of charge can be completed at 5:00. Charging of target vehicle A to the target level of charge can be completed at 6:00.

FIG. 7A-2 is a time schedule table indicating an example of SOC in a charging plan set in the variation suppression mode. In FIG. 7A-2, a horizon axis represents time, and a vertical axis represents SOC (%). As illustrated in FIG. 7A-2, at a charging start time of 17:00, the SOC of target vehicles A, B, and C is 50%, 20%, and 60%, respectively, and variation in the SOC between the vehicles is 40% (=60%−20%) at maximum. After charging starts, the variation in the SOC between the vehicles decreases. At 19:00, for example, the SOC of target vehicles A, B, and C is 50%, 30%, and 60%, respectively, and the variation in the SOC between the vehicles is 30% (=60%−30%) at maximum. At 20:00, the SOC of target vehicles A, B, and C is 50%, 40%, and 60%, respectively, and the variation in the SOC between the vehicles is 20% (=60%−40%) at maximum. At 21:00, the SOC of target vehicles A, B, and C is 50%, 60%, and 60%, respectively, and the variation in the SOC between the vehicles is 10%(=60%−50%) at maximum. At 23:00, the SOC of target vehicles A, B, and C is all 60%, and the variation in the SOC between the vehicles is 0%. As described above, the variation in the SOC between the vehicles decreases after the charging starts.

Even six hours after the start of the charging, the variation in the SOC between the vehicles is still kept suppressed. At 0:00, for example, the SOC of target vehicles A, B, and C is 70%, 60%, and 70%, respectively, and the variation in the SOC between the vehicles is 10% (=70%−60%), and at 1:00, the SOC of target vehicles A, B, and C is 70%, 70%, and 80%, respectively, and the variation in the SOC between the vehicles is 10% (=80%−70%). At 2:00, the SOC of target vehicles A, B, and C is all 80%, and the variation in the SOC between the vehicles is 0%. At 3:00, the SOC of target vehicles A, B, and C is 90%, 80%, and 90%, respectively, and the variation in the SOC between the vehicles is 10% (=90%−80%) at maximum. At 4:00, the SOC of target vehicles A, B, and C is 90%, 90%, and 100%, respectively, and the variation in the SOC between the vehicles is 10% (=100%−90%) at maximum. At 5:00, the SOC of target vehicles A, B, and C is 90%, 100%, and 100%, respectively, and the variation in the SOC between the vehicles is 10% (=100%−90%) at maximum. At 6:00, the SOC of target vehicles A, B, and C is all 100%, and the variation in the SOC between the vehicles is 0%. As described above, even six hours after the start of the charging, the variation in the SOC between the vehicles is suppressed within 10%.

Comparative Example

Next, a case where the low-voltage charging mode is selected as the preferred mode will be described in comparison with a case where the variation suppression mode is selected.

Figures 1, 7B:
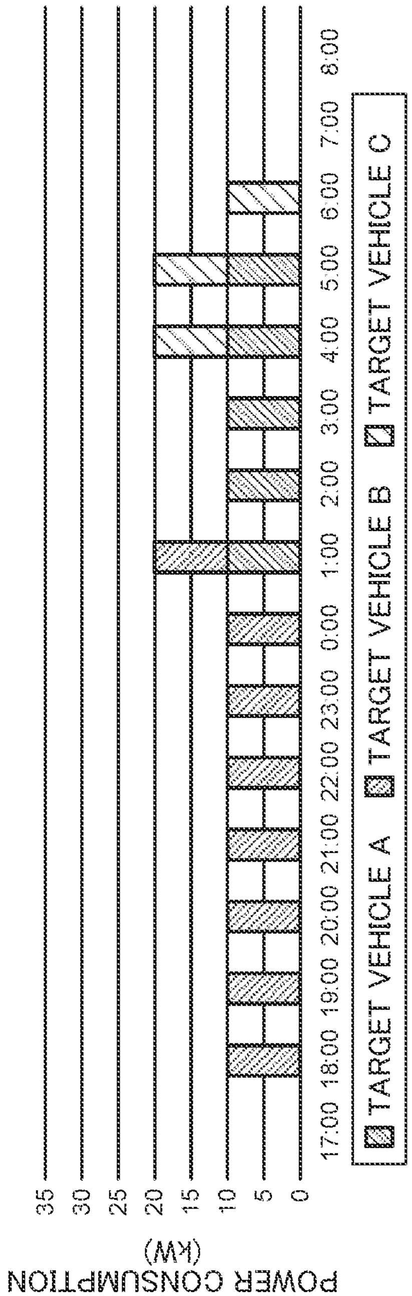
Figures 2, 7B:
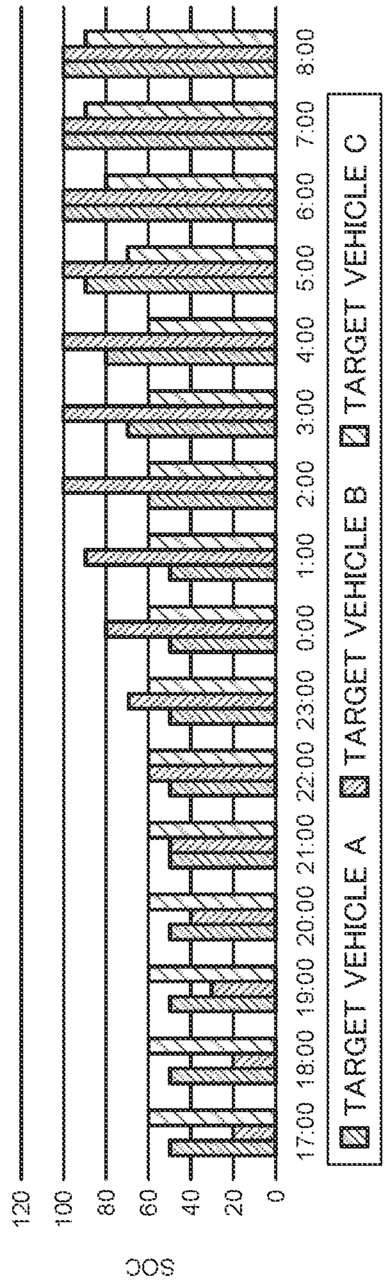

FIG. 7B-1 is a time schedule table indicating an example of a charging plan set in the low-voltage charging mode, which is a comparative example. The time schedule table of FIG. 7B-1 is the same as that illustrated in FIG. 6B. Description of the time schedule table of FIG. 7B-1, therefore, is omitted.

FIG. 7B-2 is a time schedule table indicating an example of SOC of the charging plan set in the low-voltage charging mode, which is the comparative example. In FIG. 7B-2, a horizontal axis represents time, and a vertical axis represents SOC (%). As illustrated in FIG. 7B-2, at a charging start time of 17:00, the SOC of target vehicles A, B, and C is 50%, 20%, and 60%, respectively, and variation in the SOC between the vehicles is 40% (=60%−20%) at maximum. The variation in the SOC between the vehicles at the charging start time when the low-voltage charging mode is selected is the same as when the variation suppression mode is selected (refer to FIG. 7A-2).

When the low-voltage charging mode is selected, at 2:00, the SOC of target vehicles A, B, and C is 60%, 100%, and 60%, respectively, and the variation in the SOC between the vehicles is 40% (=100%−60%) at maximum.

When the variation suppression mode is selected, on the other hand, the SOC of target vehicles A, B, and C at 2:00 is all 80%, and the variation in the SOC between the vehicles is 0% (refer to FIG. 7A-2).

At 2:00, whereas the SOC when the low-voltage charging mode is selected is about 60%, the SOC when the variation suppression mode is selected is about 80%. In addition, whereas the variation in the SOC between the vehicles when the low-voltage charging mode is selected is 40% at maximum, the variation in the SOC between the vehicles when the variation suppression mode is selected is 0%. When the variation suppression mode is selected, therefore, the SOC can be aligned compared to when the low-voltage charging mode is selected. Even when a power outage occurs, for example, all the vehicles have been charged to similar degrees.

When the low-voltage charging mode is selected, the SOC of target vehicles A, B, and C at 6:00 is 100%, 100%, and 80%, respectively, and the variation in the SOC between the vehicles is 20% (=100%−80%) at maximum. That is, when the low-voltage charging mode is selected, the target vehicles are sequentially charged to full capacity.

When the variation suppression mode is selected, on the other hand, the SOC of target vehicles A, B, and C at 6:00 is all 100%, and the variation in the SOC between the vehicles is 0%. When the variation suppression mode is selected, differences between times at which the target vehicles are charged to full capacity can be suppressed.

<Error Information>

As described above, the CPU (setting section 105) of management apparatus 100 sets a charging plan on the basis of the charging parameters (an available charging start time, charging equipment information, and contracted power), SOC, operation plan information (a target level of charge, a scheduled departure time, and scheduled work time), and a preferred mode. The CPU sets the charging plan in accordance with the preferred mode. In a set charging plan, however, there might be a vehicle that cannot be charged to a target level of charge by a scheduled departure time of the vehicle. Such a situation might occur when, for example, there are a lot of target vehicles or SOC of target vehicles is all low. In the following description, information indicating a vehicle that cannot be charged to a target level of charge by a scheduled departure time will be simply referred to as "error information". When a result of S505 in FIG. 5 is YES, for example, the process proceeds to S509, and the manager is notified of error information (plan error notification). Details of the error information and the error notification will be described hereinafter.

Figure 8B:
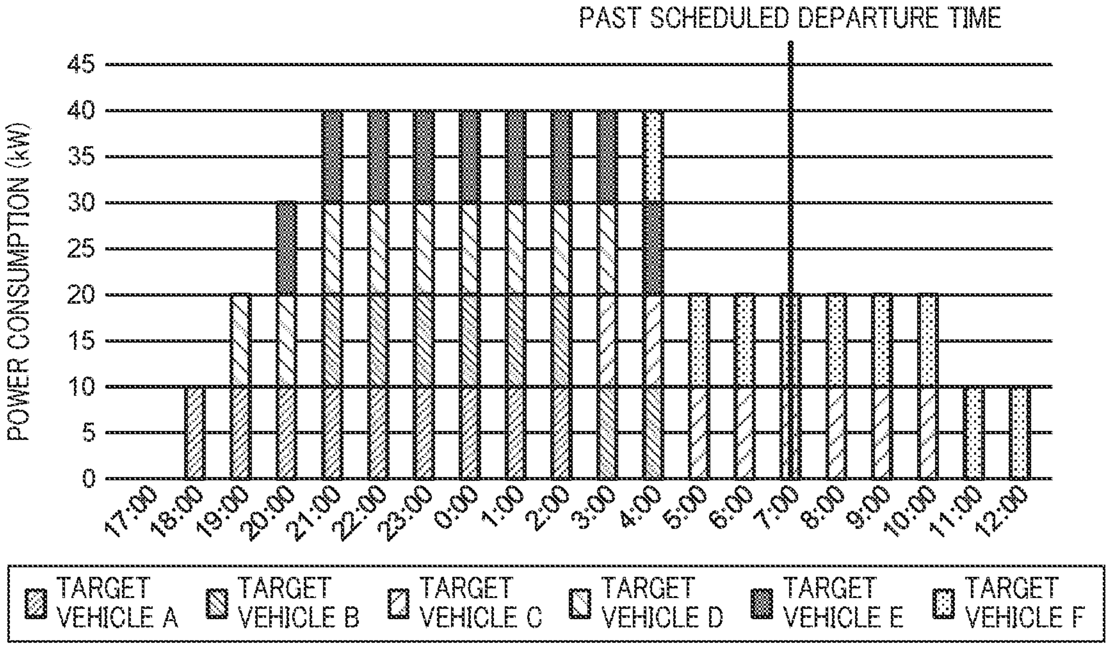
FIG. 8B is a time schedule table indicating the example of a charging plan.

Next, the error information will be described with reference to FIGS. 8A and 8B. FIG. 8A is a list (charging plan table) indicating an example of the charging plan. FIG. 8A illustrates an available charging start time, a scheduled departure time, a target level of charge, latest SOC, charge amount, a charging rate, a charging start time, and a charging end time, which are charging plan information regarding each of target vehicles A, B, C, D, E, and F. Here, the charging start time and the charging end time are times in the charging plan. The charging start time, therefore, is a scheduled charging start time. The charging end time is a scheduled charging end time.

In the present embodiment, charging system CS performs remote charging control in accordance with the list (charging plan table) of the charging plan illustrated in FIG. 8A. The charging plan may include charging periods, times at which charger 130 and battery 121 are connected to each other (scheduled connection times), charging error establishment conditions, and interruption time of scheduled interruption vehicles as well as the available charging start times.

Charging of a vehicle based on a charging plan might be interrupted. Charging is interrupted, for example, when charger 130 and battery 121 are not connected to each other, a vehicle apparatus (fixture) provided for a target vehicle is performing a certain operation, or there is a certain period of time between charging periods. A vehicle with the certain period of time between charging periods will be referred to as a "scheduled interruption vehicle". The certain period of time includes, for example, scheduled work time.

With respect to target vehicle A, for example, the available charging start time is 18:00, the scheduled departure time is 7:00, the target level of charge is 100% (100 kWh), the latest SOC is 10% (50 kWh), the charge amount is 50 kWh, the charging rate is 10 KW, the charging start time is 18:00, and the charging end time is 3:00 as illustrated in FIG. 8A.

With respect to target vehicle B, for example, the available charging start time is 18:00, the scheduled departure time is 7:00, the target level of charge is 100% (100 kWh), the latest SOC is 20% (20 kWh), the charge amount is 80 kWh, the charging rate is 10 KW, the charging start time is 21:00, and the charging end time is 5:00.

With respect to target vehicle C, for example, the available charging start time is 18:00, the scheduled departure time is 6:00, the target level of charge is 100% (100 kWh), the latest SOC is 20% (20 kWh), the charge amount is 40 kWh, the charging rate is 10 kW, the charging start time is 3:00, and the charging end time is 11:00.

With respect to target vehicle D, for example, the available charging start time is 18:00, the scheduled departure time is 7:00, the target level of charge is 100% (100 kWh), the latest SOC is 10% (50 kWh), the charge amount is 50 kWh, the charging rate is 10 KW, the charging start time is 19:00, and the charging end time is 4:00.

With respect to target vehicle E, for example, the available charging start time is 18:00, the scheduled departure time is 6:00, the target level of charge is 100% (100 kWh), the latest SOC is 10% (20 kWh), the charge amount is 80 kWh, the charging rate is 10 KW, the charging start time is 20:00, and the charging end time is 5:00.

With respect to target vehicle F, for example, the available charging start time is 18:00, the scheduled departure time is 7:00, the target level of charge is 100% (100 kWh), the latest SOC is 20% (50 kWh), the charge amount is 40 kWh, the charging rate is 10 KW, the charging start time is 4:00, and the charging end time is 13:00.

As illustrated in FIG. 8A, the charging end time of 11:00 of target vehicle C is later than the scheduled departure time of 6:00. The charging end time of 13:00 of target vehicle F is later than the scheduled departure time of 7:00. That is, target vehicles C and F are vehicles whose charging will not be completed by the scheduled departure times. The charging end times of target vehicles C and F are displayed in a display mode different from one for the charging end times of the other target vehicles whose charging will be completed by the scheduled departure times. The display mode is, for example, a display effect such as color, thickness, size of letters, display color of cells, or flashing. It is assumed, for example, that a font indicating the charging end times of target vehicles C and F is displayed in red. Since the font indicating the charging end times is displayed in red, the manager can visually recognize information (error information) indicating the vehicles that cannot be charged to the target levels of charge by the scheduled departure times.

FIG. 8B is a time schedule table indicating an example of a charging plan. In FIG. 8B, a horizontal axis represents time, and a vertical axis represents power consumption (kW). Left-inclined hatching indicates times of charging and power consumption of target vehicle A. Right-inclined hatching indicates times of charging and power consumption of target vehicle B. Left-inclined, sparse hatching indicates times of charging and power consumption of target vehicle C. Right-inclined, sparse hatching indicates times of charging and power consumption of target vehicle D. Dotted hatching indicates times of charging and power consumption of target vehicle E. Sparsely dotted hatching indicates times of charging and power consumption of target vehicle F. A vertical line indicates the scheduled departure time.

As illustrated in FIG. 8B, the charging end time of 13:00 of target vehicle F is later than the scheduled departure time of 7:00. That is, target vehicle F is a vehicle whose charging will not be completed by the scheduled departure time. The charging end time of 11:00 of target vehicle C is later than the scheduled departure time of 6:00. That is, target vehicle C is a vehicle whose charging will not be completed by the scheduled departure time.

Since the positions of hatching indicating the times of charging and the power consumption exceed a position of the charging end time, the manager can visually recognize information (error information) indicating the vehicles that cannot be charged to the target levels of charge by the scheduled departure time.

As described above, since the font indicating the charging end times is displayed in red in the list (charging plan table) of FIG. 8A indicating the charging plan and the vertical line is displayed at the position of the scheduled departure time in the time schedule table of FIG. 8B indicating the charging plan, the manager can visually recognize that the target vehicles are vehicles whose charging will not be completed by the scheduled departure times.

When there is a vehicle whose charging will not be completed by a scheduled departure time of the vehicle, the manager needs to select a measure to be taken, such as checking or changing of a charging plan. For this purpose, the manager is preferably notified more reliably of information (error information) indicating a vehicle whose charging will not be completed by a scheduled departure time of the vehicle. In addition, the manager is preferably notified of selection information indicating available measures.

When there is a vehicle whose charging will not be completed by a scheduled departure time of the vehicle, the CPU of management apparatus 100 transmits error information to terminal apparatus 110. The CPU of terminal apparatus 110 displays the error information on an operation screen of display section 115. The CPU also displays selection information on the operation screen.

<Error Notification and Selection Information>

Figure 9A:
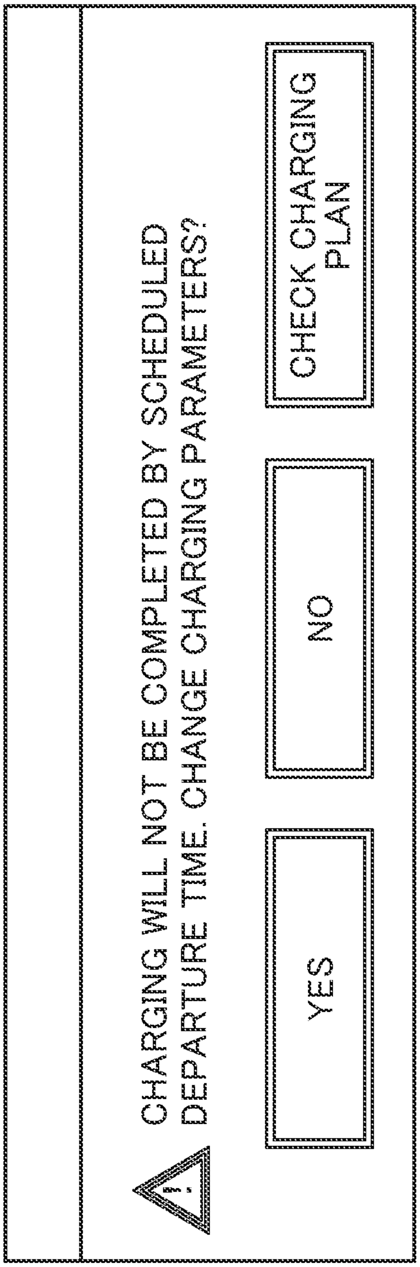
FIG. 9A is a diagram illustrating an example of a message box displayed on an operation screen.

FIG. 9A is a diagram illustrating an example of a message box displayed on the operation screen. The CPU of terminal apparatus 110 displays a message, "Charging will not be completed by scheduled departure time. Change charging parameters?" (S509: error notification).

The CPU of terminal apparatus 110 also displays a plurality of selection buttons (selection information) on the operation screen. More specifically, the CPU displays selection buttons "yes", "no", and "check charging plan" on the operation screen. When the selection button "yes" is pressed, the CPU of terminal apparatus 110 returns the process to the inputting of the charging parameters (YES in S510). When the selection button "no" is pressed, the CPU causes the process to proceed to the revising of the charging plan (No in S510). When the selection button "check charging plan" is pressed, the CPU displays the charging plan on the operation screen of display section 115. The CPU may superimpose the selection button "check charging plan" and the charging plan upon each other on the operation screen.

<Charging Plan Displayed on Operation Screen when Selection Button "Check Charging Plan" is Pressed>

FIG. 9B is a time schedule table indicating an example of a charging plan displayed in an upper part of the operation screen and a time schedule table indicating an example of SOC in the charging plan displayed in a lower part of the operation screen. The time schedule table of FIG. 9B indicating the charging plan is the same as the time schedule table of FIG. 8A indicating the charging plan, and description thereof is omitted. The time schedule table of FIG. 9B indicating the SOC is the same as the time schedule table of FIG. 8B indicating the SOC, and description thereof is omitted.

When the selection button "check charging plan" is pressed, the CPU of terminal apparatus 110 displays the time schedule table indicating the charging plan and the time schedule table indicating the SOC on the operation screen of display section 115.

The CPU of terminal apparatus 110 also displays an operation button "return" on the operation screen, on which the time schedule table indicating the charging plan and the like are displayed. When the operation button "return" is pressed, the CPU returns the process and displays the plurality of selection buttons (selection information) on the operation screen of display section 115.

<Schedule Notification>

The error information and the like have been described. Next, the schedule notification (S506), where the CPU of terminal apparatus 110 displays a certain screen on the operation screen of display section 115 after the CPU of management apparatus 100 transmits charging plan information to terminal apparatus 110, will be described.

Figure 10:
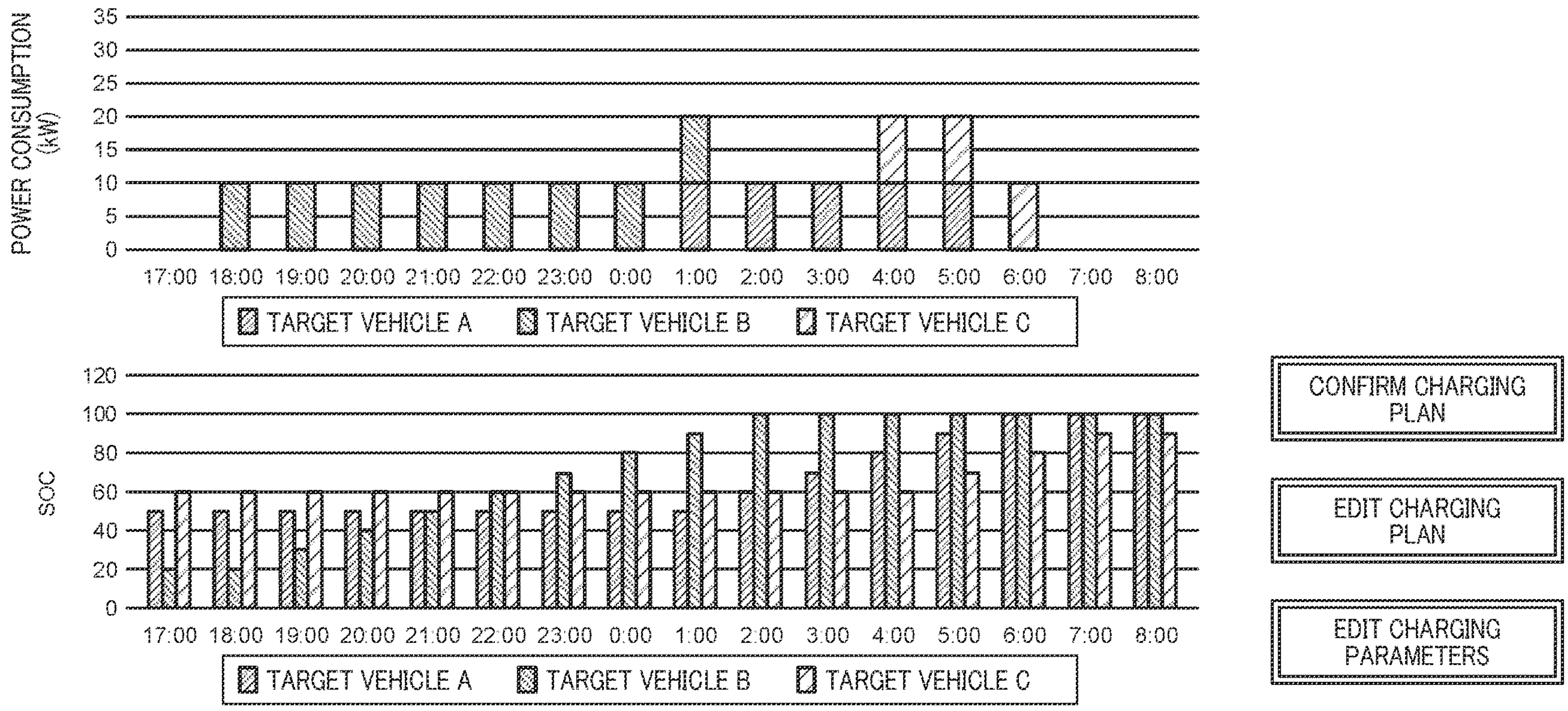
FIG. 10 is a list indicating an example of schedule notification.

FIG. 10 is a diagram illustrating an example of the schedule notification. The CPU of terminal apparatus 110 displays a list of a charging plan (charging plan table) in an upper part of the operation screen and a schedule table of the charging plan and a schedule table of SOC in a lower part of the operation screen.

FIG. 10 illustrates available charging start times, scheduled departure times, target levels of charge, latest SOC, charge amount, charging rates, charging start times, and charging end times, which are charging plan information regarding target vehicles A, B, and C.

With respect to target vehicle A, for example, the available charging start time is 18:00, the scheduled departure time is 7:00, the target level of charge is 100% (100 kWh), the latest SOC is 10% (50 kWh), the charge amount is 50 kWh, the charging rate is 10 KW, the charging start time is 1:00, and the charging end time is 6:00.

With respect to target vehicle B, for example, the available charging start time is 18:00, the scheduled departure time is 7:00, the target level of charge is 100% (100 kWh), the latest SOC is 20% (20 kWh), the charge amount is 80 kWh, the charging rate is 10 KW, the charging start time is 18:00, and the charging end time is 2:00.

With respect to target vehicle C, for example, the available charging start time is 18:00, the scheduled departure time is 7:00, the target level of charge is 100% (100 kWh), the latest SOC is 60% (60 kWh), the charge amount is 40 kWh, the charging rate is 10 kW, the charging start time is 4:00, and the charging end time is 7:00.

As indicated by the charging plan table (schedule), the charging end time "6:00" of target vehicle A is not later than the scheduled departure time "7:00", the charging end time "2:00" of target vehicle B is not later than the scheduled departure time "7:00", and the charging end time "7:00" of target vehicle C is not later than the scheduled departure time "7:00". Since there is no vehicle whose charging will not be completed by a scheduled departure time of the vehicle, therefore, information (error information) indicating a vehicle whose charging up to a target level of charge by a scheduled departure time of the vehicle is not displayed in the schedule notification.

The schedule table of FIG. 10 indicating the charging plan indicates that the charging end times of all the vehicles (target vehicles A, B, and C) come before the scheduled departure time of 7:00.

The schedule table of FIG. 10 indicating SOC indicates that the SOC of all the vehicles reaches the target level of charge before the scheduled departure time of 7:00.

The CPU of terminal apparatus 110 displays selection buttons "confirm charging plan", "edit charging plan", and "edit charging parameters" on the operation screen, on which the time schedule table indicating the charging plan and the like are displayed.

When the selection button "confirm charging plan" is pressed, the CPU of terminal apparatus 110 confirms the charging plan (schedule), assuming that the manager has approved the charging plan.

When the selection button "edit charging plan" is pressed, the CPU of terminal apparatus 110 makes the charging plan (the target level of charge, the charge amount, etc.) editable.

When the selection button "edit charging parameters", the CPU of terminal apparatus 110 makes the charging parameters (the available charging start time, the charging equipment information, and the contracted power) editable.

<Vehicles 120>

Figure 3C:
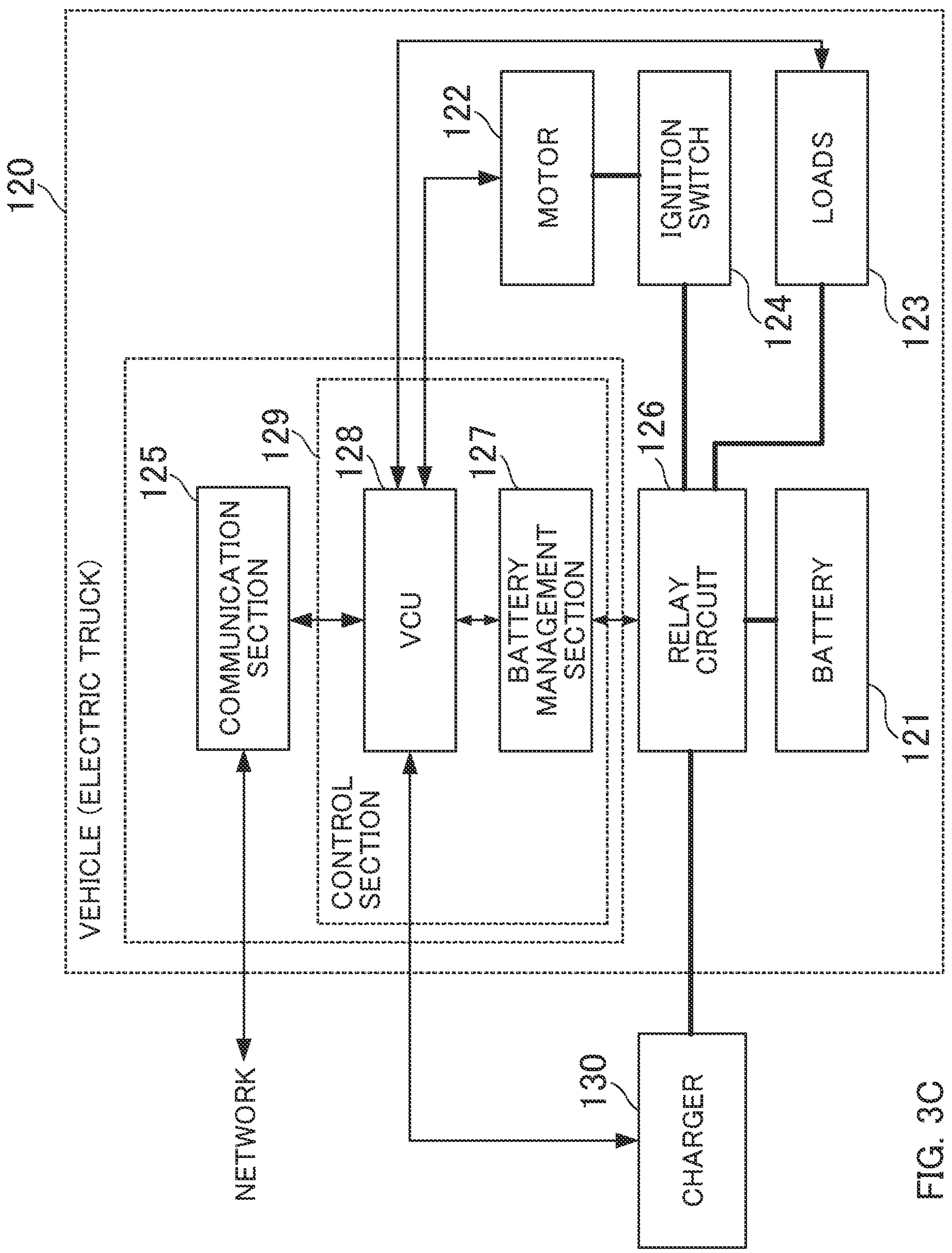
FIG. 3C illustrates functional blocks indicating functions of a vehicle included in the charging system according to the embodiment of the present disclosure.

Next, configuration of vehicles 120 will be described with reference to FIG. 3C.

Each vehicle 120 includes motor 122, loads 123, ignition switch 124, communication section 125, relay circuit 126, battery management section 127, and vehicle control unit (VCU) 128. Battery management section 127 and VCU 128 are included in control section 129. Motor 122 is connected to relay circuit 126 through ignition switch 124. Loads 123 include a heater and a fixture.

(Communication Section 125)

Communication section 125 has a communication function for connecting to a network. Communication section 125 transmits and receives various pieces of information to and from management apparatus 100 over the network. The various pieces of information include, for example, charging plan information, target vehicle information, charger connection information indicating connection and disconnection between charger 130 and battery 121, and on/off information regarding ignition switch 124.

Communication section 125 transmits and receives information to and from terminal apparatus 110 over the network. The information includes, for example, charging stop information and error information.

(Relay Circuit 126)

Relay circuit 126 includes, for example, a charge relay, a motor relay, a heater relay, a fixture relay, and a battery relay. The charge relay connects and disconnects a high-voltage line between battery 121 and charger 130. The motor relay connects and disconnects a high-voltage line between battery 121 and motor 122. The heater relay connects and disconnects a high-voltage line between battery 121 and the heater, which is one of loads 123. The fixture relay connects and disconnects a high-voltage line between battery 121 and the fixture, which is the other of loads 123. The battery relay connects and disconnects a high-voltage lines between battery 121 and each of the various relays including the charge relay, the motor relay, the heater relay, and the fixture relay.

(Battery Management Section 127)

Battery management section 127 has a function of controlling relay circuit 126 on the basis of a state (temperature, voltage, etc.) of battery 121, a state of motor 122, a state of the heater, and various pieces of information from VCU 128. Battery management section 127 controls each of the various relays including the charge relay, the motor relay, the heater relay, the fixture relay, and the battery relay.

(VCU 128)

VCU 128 has a function of determining a state of vehicle 120 and performing control for maintaining vehicle 120 in an optimal state.

VCU 128 is a processor such as a CPU or a GPU and executes application programs stored in an internal storage section (a RAM, a ROM, etc.). More specifically, VCU 128 controls relay circuit 126 through battery management section 127. VCU 128 also controls charger 130 such that charging power for charging battery 121 becomes a certain level.

Functional blocks of battery management section 127 and VCU 128 are not components in units of hardware (apparatuses) but components in units of functions. Functional blocks illustrated in FIG. 3C, therefore, may be implemented in a single apparatus or a plurality of apparatuses. When the functions are achieved by a plurality of apparatuses, corresponding apparatuses may achieve the functions, or a combination of two apparatuses and another apparatus may achieve the functions. Communication of data between the functional blocks may be performed through any means such as a data bus or a controller area network (CAN) bus. It is assumed in this example that a single processor (CPU) executes the functions of battery management section 127 and VCU 128.

Management apparatus 100 (server), terminal apparatus 110, and vehicles 120 included in charging system CS have been described. When configured as above, charging system CS is capable of setting a charging plan (schedule) and remotely controlling charging of batteries 121 from chargers 130 in accordance with the set charging plan (schedule) (remote charging control).

<Remote Charging Control by Management Apparatus 100>

Next, the remote charging control will be described. In the following description, remote charging control by management apparatus 100 will be described first. Remote charging control by vehicle 120 will be described thereafter.

Figure 11:
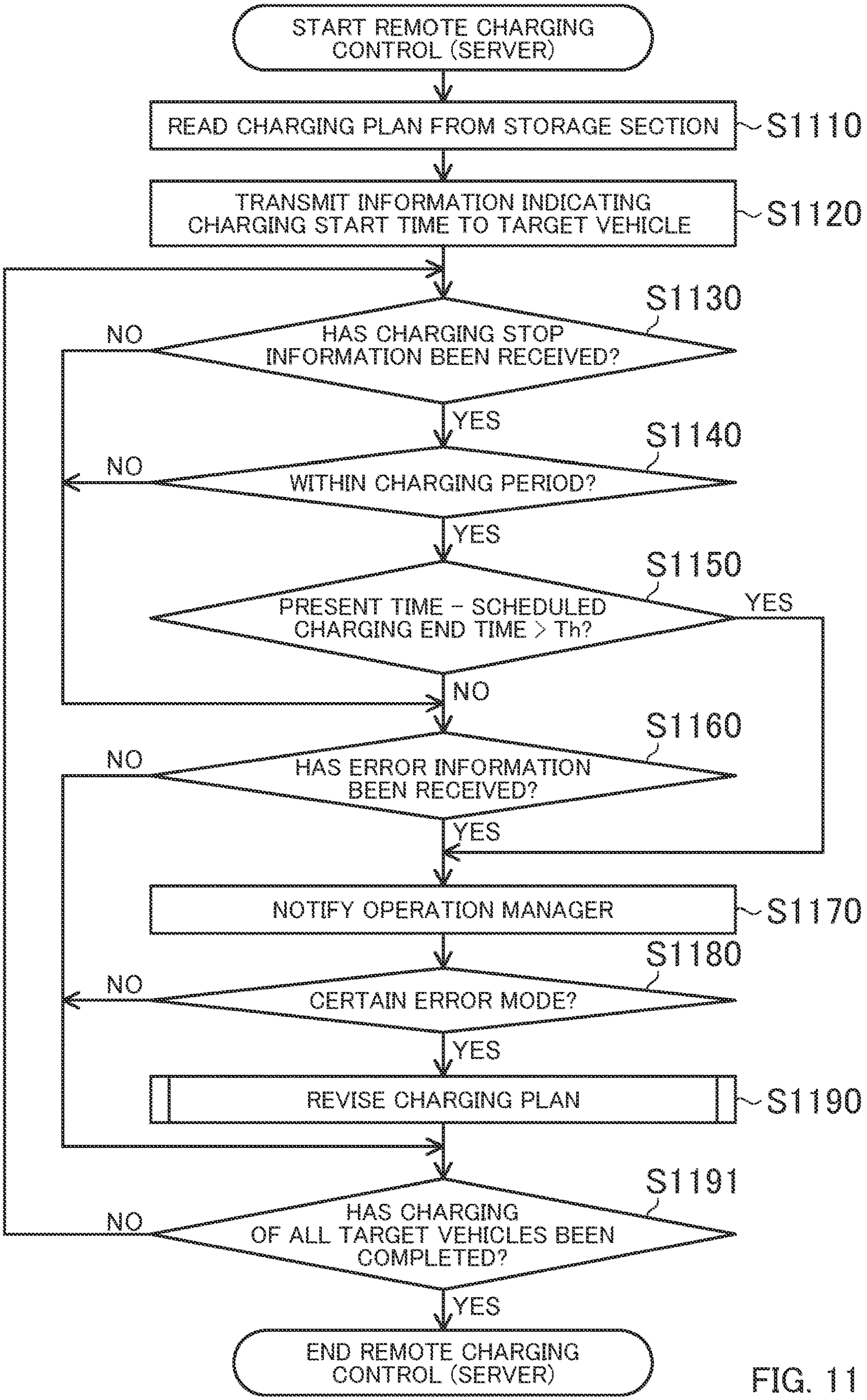
FIG. 11 is a flowchart illustrating remote charging control by the management apparatus.

FIG. 11 is a flowchart illustrating the remote charging control by management apparatus 100. This process starts when, for example, management apparatus 100 receives information (e.g., charger connection information) from vehicle 120. It is assumed in the following description that storage section 103 stores in advance charging parameters, SOC, operation plan information, and a preferred mode. It is also assumed in the following description that control section 102 of management apparatus 100 executes the functions of management apparatus 100.

First, in step S1110, control section 102 reads a charging plan from storage section 103.

Next, in step S1120, control section 102 transmits information indicating a charging start time to a target vehicle.

Next, in step S1130, control section 102 determines whether charging stop information has been received from vehicle 120. The charging stop information is information indicating a charging state of vehicle 120 and that a charger is not charging vehicle 120. When charging stop information has been received (YES in step S1130), the process proceeds to step S1140. When charging stop information has not been received (NO in step S1130), the process proceeds to step S1160.

In step S1140, control section 102 determines whether a present time is within a charging period. When the present time is within a charging period (YES in step S1140), the process proceeds to step S1150. When the present time is not within a charging period (NO in step S1140), the process proceeds to step S1160.

Next, in step S1150, control section 102 determines whether an absolute value of a difference between the present time and a scheduled charging end time exceeds a threshold (Th). When the absolute value exceeds the threshold (Th) (YES in step S1150), the process proceeds to step S1170. When the absolute value does not exceed the threshold (Th) (NO in step S1150), the process proceeds to step S1160. The process from step S1130 to step S1150 is performed to determine, when the charging of vehicle 120 has been stopped, whether the stop is appropriate for the charging plan. When the charging of vehicle 120 has been stopped, control section 102 determines, when the present time is not within a charging period set in the charging plan, that operation is normal, and determines, when the present time is within a charging period, that an abnormality might have occurred. When determining that an abnormality might have occurred and the difference between the scheduled charging end time and the present time is smaller than the certain threshold, control section 102 determines that the charging has been completed earlier than the scheduled charging end time and no abnormality has occurred. When the difference is larger than the certain threshold, control section 102 determines that an abnormality might have occurred and proceeds to notification to the manager (S1170).

In step S1160, control section 102 determines whether error information indicating interruption of charging has been received. When error information has been received (YES in step S1160), the process proceeds to step S1170. When error information has not been received (NO in step S1160), the process proceeds to step S1191.

In step S1170, control section 102 transmits the error information to terminal apparatus 110 (notification to the operation manager).

Next, in step S1180, control section 102 determines whether the error information indicates a certain error mode. When the error information indicates the certain error mode (YES in step S1180), the process proceeds to step S1190. When the error information does not indicate the certain error mode (NO in step S118), the process proceeds to step S1191. In step S1190, control section 102 revises the charging plan.

Next, in step S1191, control section 102 determines whether charging of all target vehicles has been completed. When the charging of all the target vehicles has been completed (YES in step S1191), the process ends. When the charging of a subset of the target vehicles has not been completed (NO in step S1191), the process returns to step S1130.

<Remote Charging Control by Vehicle 120>

Figure 12:
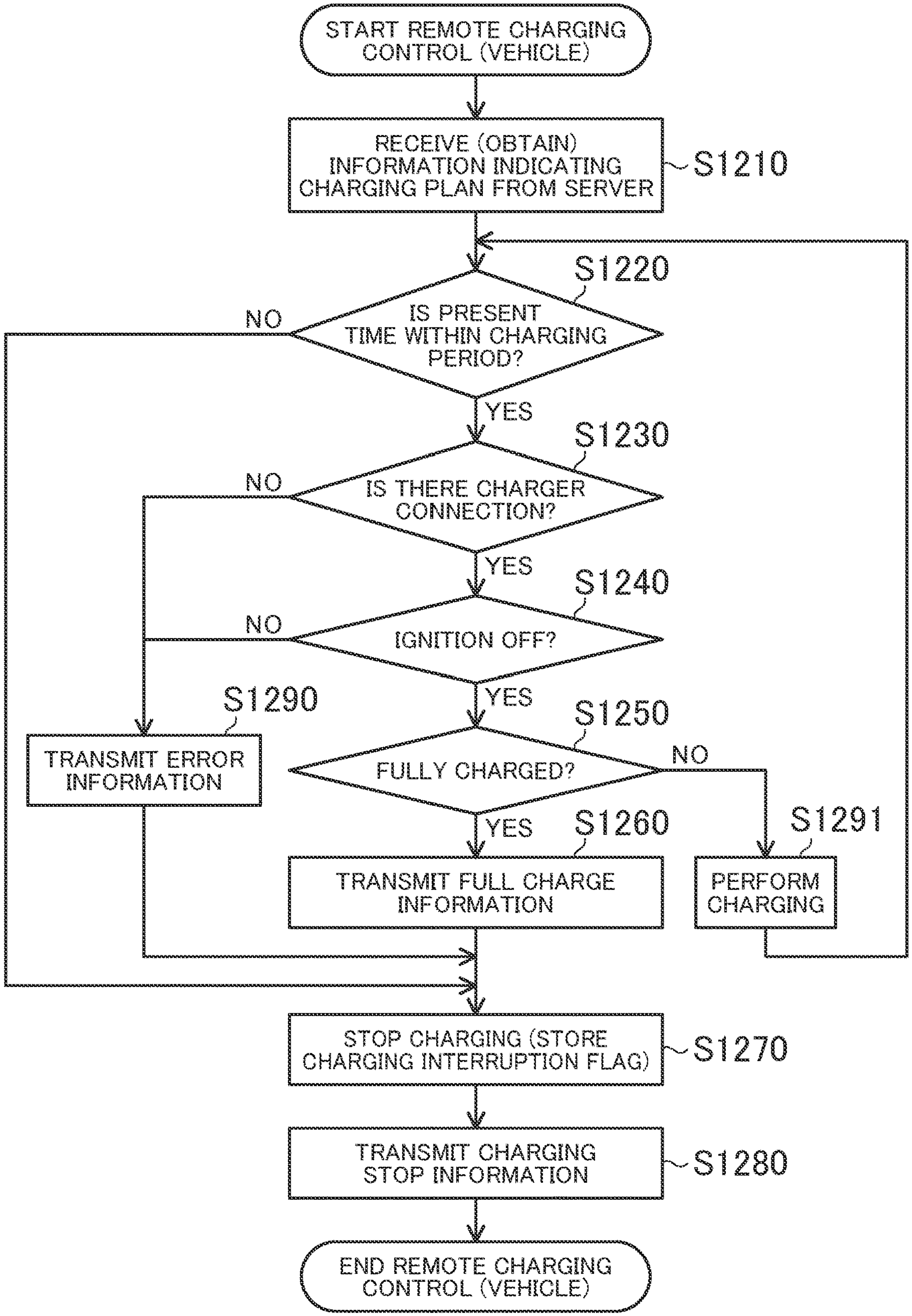
FIG. 12 is a flowchart illustrating remote charging control by a vehicle.

Next, the remote charging control by vehicle 120 will be described with reference to FIG. 12. FIG. 12 is a flowchart illustrating the remote charging control by vehicle 120. This process starts when, for example, communication section 125 of vehicle 120 receives control information from management apparatus 100. It is assumed in the following description that battery management section 127 and VCU 128 of vehicle 120 perform the remote charging control by vehicle 120.

First, in step S1210, control section 129 receives (obtains) a charging plan from management apparatus 100 (server).

Next, in step S1220, control section 129 determines whether the present time is within a charging period. When the present time is within a charging period (YES in step S1220), the process proceeds to step S1230. When the present time is not within a charging period (NO in step S1220), the process proceeds to step S1290.

In step S1230, control section 129 determines whether there is a charger connection, where charger 130 and battery 121 are connected to each other. When there is a charger connection (YES in step S1230), the process proceeds to step S1240. When there is no charger connection (NO in step S1230), the process proceeds to step S1290.

Next, in step S1240, control section 129 determines whether ignition switch 124 (refer to FIG. 3C) is off. When ignition switch 124 is off (YES in step S1240), the process proceeds to step S1250. When ignition switch 124 is not off (NO in step S1240), the process proceeds to step S1290.

In step S1250, control section 129 determines whether battery 121 is fully charged. When battery 121 is fully charged (YES in step S1250), the process proceeds to step S1260. When battery 121 is not fully charged (NO in step S1250), the process proceeds to step S1291.

In step S1260, control section 129 transmits full charge information, which indicates that battery 121 is fully charged.

Next, in step S1270, control section 129 performs control for stopping the charging and control for storing a charging interruption flag.

Next, in step S1280, control section 129 performs control for transmitting charging stop information to management apparatus 100.

In step S1290, control section 129 performs control for transmitting error information indicating interruption of charging to management apparatus 100.

Next, in step S1291, control section 129 performs control for charging battery 121. The process then returns to step S1220.

<On/off Control of Charging by Management Apparatus 100 (Server)>

In the remote charging control by vehicle 120, vehicle 120 obtains a charging plan from management apparatus 100 (server) and performs on/off control of charging.

Figure 13:
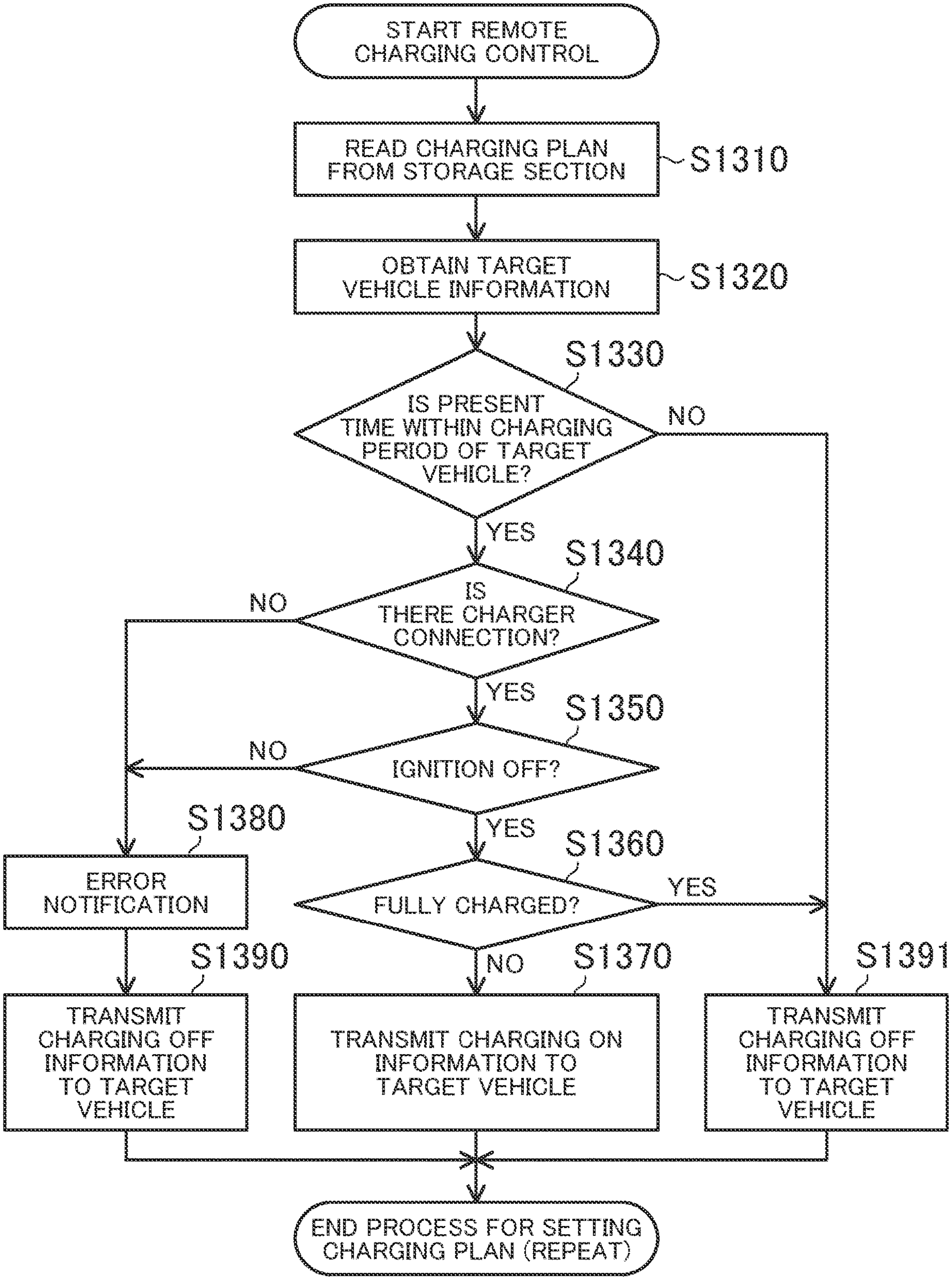
FIG. 13 is a flowchart illustrating a process performed when the management apparatus performs on/off control in the remote charging control.

Next, a case where management apparatus 100 (server) performs on/off control of charging will be described with reference to FIG. 13. FIG. 13 is a flowchart illustrating a process performed when management apparatus 100 performs the on/off control in the remote charging control. In the following description, control section 102 of management apparatus 100 (server) executes the functions of management apparatus 100.

In step S1310, control section 102 reads a charging plan from storage section 103.

Next, in step S1320, control section 102 obtains target vehicle information from the charging plan. The target vehicle information is information necessary to perform charging control for a target vehicle from management apparatus 100. For example, the target vehicle information includes identification information regarding the target vehicle, information indicating addresses for communicating with the target vehicle, and control codes for performing charging control for the target vehicle from management apparatus 100.

Next, in step S1330, control section 102 determines whether the present time is within a charging period of the target vehicle. When the present time is within the charging period of the target vehicle (YES in step S1330), the process proceeds to step S1340. When the present time is not within the charging period of the target vehicle (NO in step S1330), the process proceeds to step S1391.

In step S1340, control section 102 determines whether there is a charger connection, where charger 130 and battery 121 are connected to each other. When there is a charger connection (YES in step S1340), the process proceeds to step $1350. When there is no charger connection (NO in step S1340), the process proceeds to step S1380.

In step S1350, control section 102 determines whether ignition switch 124 is off. When ignition switch 124 is off (YES in step S1350), the process proceeds to step S1360. When ignition switch 124 is not off (NO in step S1350), the process proceeds to step S1380.

In step S1360, control section 102 determines whether battery 121 is fully charged. When battery 121 is fully charged (YES in step S1360), the process proceeds to step S1391. When battery 121 is not fully charged (NO in step S1360), the process proceeds to step S1370.

In step S1370, control section 102 transmits charging on information, which indicates continuation of charging, to the target vehicle. The process then ends.

In step S1380, control section 102 issues an error notification (charging error notification), which indicates interruption of charging.

Next, in step S1390, control section 102 transmits charging off information, which indicates interruption of charging, to the target vehicle. Control section 102 stores a charging interruption flag in storage section 113.

In step S1391, control section 102 transmits charging off information, which indicates an end (completion) of charging, to the target vehicle. The process then ends.

As described above, since charging on information or charging off information is transmitted to a target vehicle as necessary in this process when management apparatus 100 (server) performs the on/off control of charging, VCU 128 of vehicle 120, for example, can control relay circuit 126 in a timely and appropriate manner on the basis of the charging on information and the charging off information.

<Reconnection after Interruption>

As described above, charging system CS performs the remote charging control. When charger 130 and battery 121 are disconnected from each other during the remote charging control, charging is interrupted.

Figure 14:
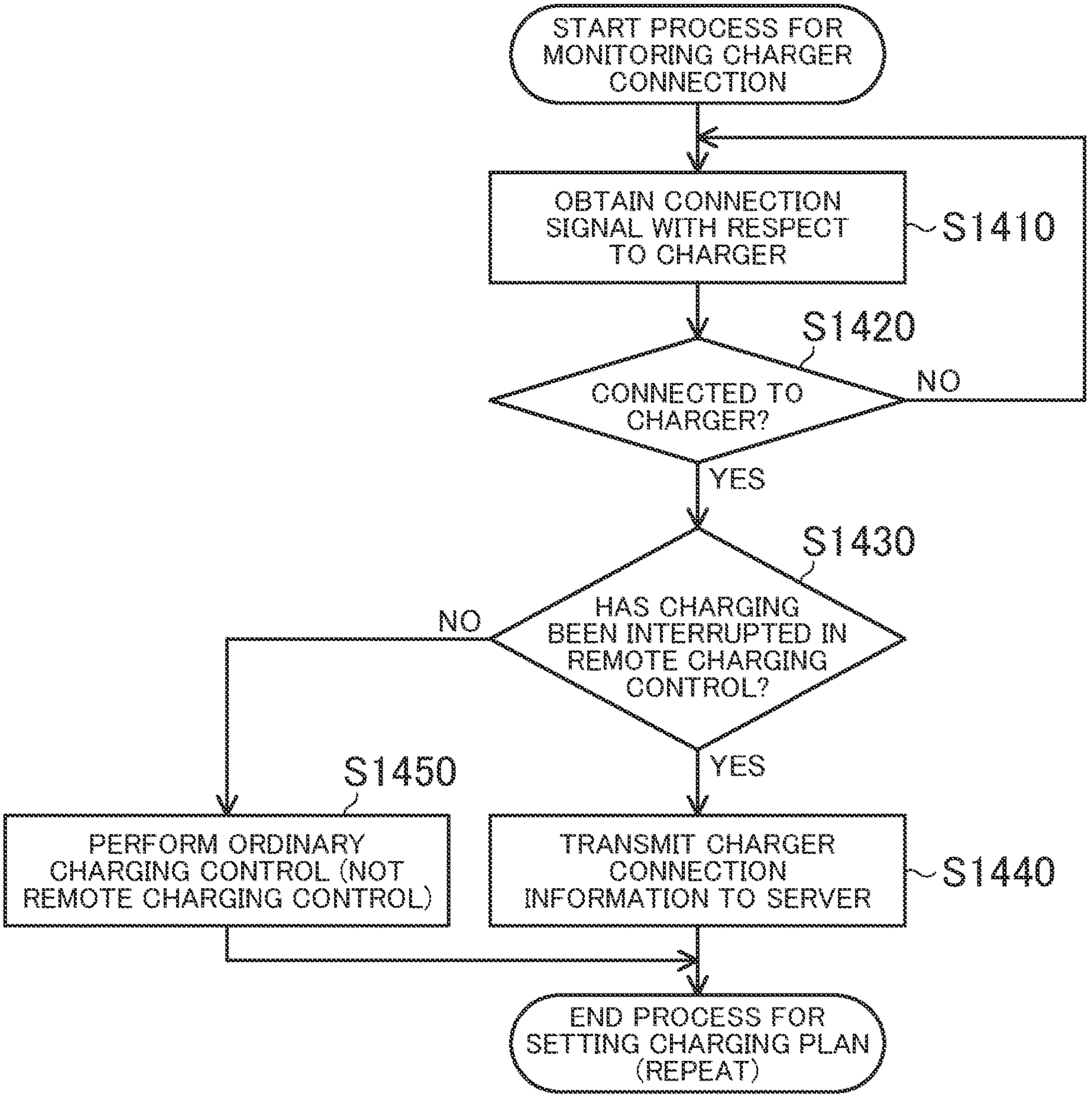
FIG. 14 is a flowchart illustrating reconnection after an interruption in the remote charging control.

Next, reconnection after an interruption will be described with reference to FIG. 14. FIG. 14 is a flowchart illustrating reconnection after an interruption in the remote charging control. In the remote charging control, VCU 128 (refer to FIG. 3C) monitors a connected/disconnected state between charger 130 and battery 121. In the following description, control section 102 of management apparatus 100 executes the functions of management apparatus 100. This process is repeated when a certain period of time has elapsed since the process ended.

First, in step S1410, control section 102 obtains a connection signal indicating a connected/disconnected state between charger 130 and battery 121.

Next, in step S1420, control section 102 determines whether charger 130 and battery 121 are connected to each other. When charger 130 and battery 121 are connected to each other (YES in step S1420), the process proceeds to step S1430. When charger 130 and battery 121 are not connected to each other (NO in step S1420), the process returns to step S1410.

In step S1430, control section 102 determines whether charging has been interrupted in the remote charging control. When charging has been interrupted (YES in step S1430), the process proceeds to step S1440. When charging has not been interrupted (NO in step S1430), the process proceeds to step S1450.

In step S1440, VCU 128 transmits charger connection information indicating the connected/disconnected state between charger 130 and battery 121 to management apparatus 100 (server). Upon receiving the charger connection information, management apparatus 100 (server) performs the setting of a charging plan (revising of a charging plan) in step S202 and the charging control in step S203 illustrated in FIG. 2. The process then ends.

In step S1450, VCU 128 performs ordinary charging control that is not the remote charging control. The process then ends.

<Display of Charging State>

In the remote charging control and the ordinary charging control, a display section (not illustrated) of vehicle 120 displays a charging state of battery 121 (display of a charging state). Display section 115 of terminal apparatus 110 may display the charging state of battery 121, instead.

Figure 15:
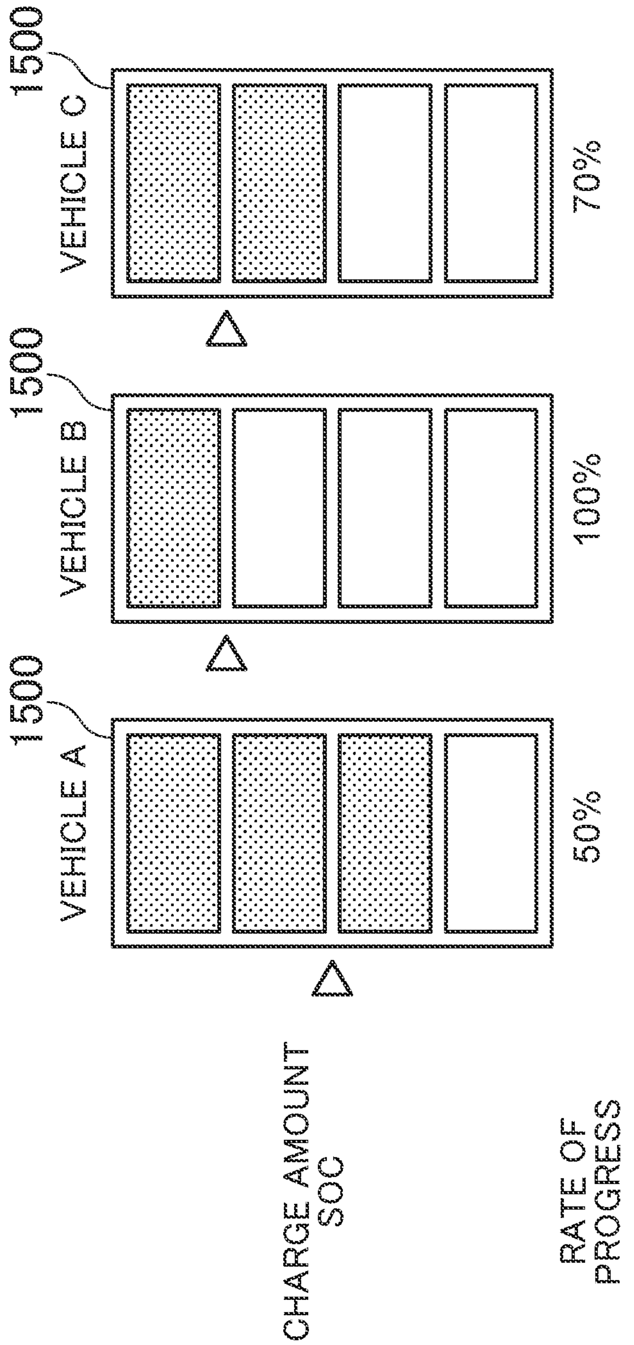
FIG. 15 is a diagram illustrating an example of displayed SOC.

Next, an example of the display of a charging state will be described with reference to FIG. 15. FIG. 15 is a diagram illustrating an example of the display of a charging state. FIG. 15 illustrates vehicles A, B, and C as target vehicles. Meter 1500 indicates charge amount SOC of battery 121 provided for each of the target vehicles. A rate of progress is indicated in percentage. An arrow indicates a target level of charge. Here, charge amount SOC is an absolute value of remaining charge of battery 121. The rate of progress is percentage of current charge amount with respect to the target level of charge set for each vehicle in the remote charging control during charging. The present disclosure is not limited to this, and the rate of progress may be percentage of the current charge amount with respect to full charge. A value indicating the percentage of the current charge amount with respect to the target level of charge set for each vehicle in the remote charging control and a value indicating the percentage of the current charge amount with respect to the full charge may be displayed side by side.

Meter 1500 indicates charge amount SOC in four stages from a fully discharged state to a fully charged state. That is, charge amount SOC is divided into four stages including a first stage, which is a lowest stage of meter 1500, and a fourth stage, which is a highest stage. The four stages of meter 1500 each have a rectangular frame. Hatching in a rectangular frame indicates that a corresponding stage is off. No hatching in a rectangular frame indicates that a corresponding stage lights up. When the four stages light up from the first to fourth stages, therefore, charge amount SOC is increasing. When all the four stages are off, for example, charge amount SOC is in the fully discharged state. When all the four stages light up, on the other hand, charge amount SOC is in the fully charged state.

As illustrated in FIG. 15, in a charging state of battery 121 of vehicle A, arrow 1501 indicating the target level of charge is located between the second and third stages of meter 1500. In meter 1500 indicating charge amount SOC, the first stage lights up, and the second and higher stages are off. The rate of progress is 50%.

In a charging state of battery 121 of vehicle B, arrow 1502 indicating the target level of charge is located between the third and fourth stages of meter 1500. In meter 1500 indicating charge amount SOC, the first to third stages light up, and the fourth stage is off. The rate of progress is 100%.

In a charging state of battery 121 of vehicle C, arrow 1503 indicating the target level of charge is located between the third and fourth stages of meter 1500. In meter 1500 indicating charge amount SOC, the first and second stages light up, and the third and higher stages are off. The rate of progress is 70%.

As described above, since charge amount SOC and the percentage of each target vehicle are displayed, the manager and a driver can visually recognize the charging state of battery 121 of the target vehicle.

Charging system CS according to the above embodiment is a charging system that controls a plurality of vehicles 120 and at least one charger 130 that supplies charging power to the plurality of vehicles 120. Charging system CS includes setting section 105 that sets, for the plurality of vehicles 120, a charging plan indicating charging start times and charging end times and control section 102 that controls charging of a battery of each of the plurality of vehicles 120 on the basis of the charging plan. Even when one of the plurality of vehicles 120 and charger 130 are connected to each other in a period for which the charging plan is set, control section

102 does not perform charging with the charging power supplied from charger 130 when present time is within a charging stop period in the charging plan.

With this configuration, since an appropriate charging plan is set and vehicles charged on the basis of the appropriate charging plan deliver packages, commercial vehicles that deliver packages can be properly operated and prepared for the operation during daytime operation hours and nighttime charging hours.

In addition, charging system CS according to the present embodiment includes obtaining section 104 that obtains charging conditions including a target level of charge and a scheduled departure time for each of the plurality of vehicles 120, and setting section 105 sets the charging plan including charging periods and charging times on the basis of the charging conditions. As a result, since a charging plan is set on the basis of an operation plan and a battery of each of a plurality of vehicles is charged on the basis of the set charging plan, the charging of the plurality of vehicles can be completed by scheduled departure times of the plurality of vehicles.

In addition, in charging system CS according to the present embodiment, setting section 105 obtains preparation work time for each of the plurality of vehicles 120 and sets a charging plan such that preparation work of the plurality of vehicles 120 will be completed by the scheduled departure times. Even when the preparation work time is different between the plurality of vehicles 120, the charging can be completed by the scheduled departure times.

In charging system CS according to the above embodiment, the operation plan information may include the number, weight, or types of packages. Setting section 105 may set a charging period and a charging time in accordance with the number, weight, or types of packages. As a result, because charge amount becomes necessary in accordance with the number of packages, a target level of charge can be calculated more accurately.

In addition, in charging system CS according to the above embodiment, the operation plan information may include a skill level of a driver, types of houses in a delivery area, or presence or absence of a fixture. An energy efficiency estimation section that estimates energy efficiency (km/kWh) in accordance with the skill level of the driver, the types of houses in the delivery area, or the presence or absence of a fixture may be included. As a result, since the energy efficiency varies depending on the skill level of the driver or the like, a target level of charge can be calculated more accurately on the basis of the estimated energy efficiency.

In addition, while vehicle 120 is running, percentage of current charge amount with respect to a target level of charge may be displayed on the display section (not illustrated) of vehicle 120 or display section 115 of terminal apparatus 110. As a result, the manager or the driver can be notified of the percentage of the current charge amount with respect to the target level of charge and the like.

In addition, it has been described that, when the fastest charging mode is selected as the preferred mode when a charging plan is set in charging system CS according to the above embodiment, setting section 105 sets charging periods such that all target vehicles will be charged as fast as possible without total charging power for the target vehicles in unit time exceeding a threshold. Alternatively, a monitoring section (the CPU of management apparatus 100) that, when a charging plan is executed, monitors power supply states of chargers during charging may be included, and the monitoring section may detect whether total charging power supplied to the target vehicles in unit time exceeds the threshold and notify terminal apparatus 110 and vehicles 120 of a result of the detection.

Furthermore, the above embodiment is just a specific example where the present disclosure is implemented, and should not be construed as limiting the technical scope of the present disclosure. That is, the present disclosure can be implemented in various manners without deviating from the spirit or principal features thereof.

The present disclosure can be appropriately used in a delivery management system including a charging system that needs to enable commercial vehicles that deliver packages to be properly operated and prepared for the operation during daytime operation hours and nighttime charging hours.

The invention claimed is:

1. A charging system for controlling charging of a plurality of vehicles, the charging system comprising:

a processor, wherein the processor is configured to:

obtain, for each of the plurality of vehicles, a remaining charge amount and a scheduled departure time, and a scheduled work time;

set a charging plan including a charging start time and a charging time for each of the plurality of vehicles, based on the remaining charge amount and the scheduled departure time, control charging of a battery of each of the plurality of vehicles based on the charging plan; and when the charging system receives charging stop information from a vehicle of the plurality of vehicles and a present time is within a charging period in the charging plan, determine whether an abnormality has occurred based on a time difference between a reception time of the charging stop information and a scheduled charging end time.

2. The charging system according to claim 1, wherein the processor is further configured to:

obtain a charging condition including a target level of charge and the scheduled departure time for each of the plurality of vehicles, and set the charging plan including a charging period and a charging time based on the charging condition.

3. The charging system according to claim 1, wherein the processor is further configured to:

obtain a time for preparation work for each of the plurality of vehicles; and set the charging plan such that the preparation work of the plurality of vehicles is completed by a scheduled departure time.

4. The charging system according to claim 1, wherein the processor is further configured to adjust a charging period or a charging time in accordance with a number, weight, or type of a package or packages, a skill level of a driver, a type of house in a delivery area, or the presence or absence of a fixture.

5. A management terminal connectable to the charging system according to claim 1, the management terminal comprising:

a communication interface configured to communicate with the charging system, wherein the communication interface is configured to:

transmit a scheduled departure time, a target level of charge, or a time for preparation work for at least one of the plurality of vehicles to the charging system; or receive, from the charging system, a charge amount of at least one of the plurality of vehicles or a scheduled connection time at which at least one of the plurality of vehicles is scheduled to be connected to the charging system, and a scheduled charging end time of at least one of the plurality of vehicles in the charging plan.

6. A vehicle connectable to the charging system according to claim 1, the vehicle comprising:

a battery;

a communication interface that receives, from the charging system, control information for remote charging control in which charging of the battery is remotely controlled according to the charging plan set based on a target level of charge;

a control section that executes charging of the battery based on the control information received by the communication interface; and a liquid crystal display that displays a percentage of a charge amount with respect to a full charge or a percentage of the charge amount with respect to a target level of charge.

7. A charging method for controlling charging of a plurality of vehicles, the charging method comprising:

obtaining, for each of the plurality of vehicles, a remaining charge amount and a scheduled departure time;

setting a charging plan including a charging start time and a charging time for each of the plurality of vehicles, based on the remaining charge amount and the scheduled departure time, controlling charging of a battery of each of the plurality of vehicles based on the charging plan; and determining, when charging stop information is received from a vehicle of the plurality of vehicles and a present time is within a charging period in the charging plan, whether an abnormality has occurred based on a time difference between a reception time of the charging stop information and a scheduled charging end time.

8. A non-transitory computer-readable recording medium storing therein a program causing a computer to perform a process of controlling charging of a plurality of vehicles, the process comprising:

obtaining, for each of the plurality of vehicles, a remaining charge amount and a scheduled departure time;

setting a charging plan including a charging start time and a charging time for each of the plurality of vehicles, based on the remaining charge amount and the scheduled departure time;

controlling charging of a battery of each of the plurality of vehicles based on the charging plan; and determining, when charging stop information is received from a vehicle of the plurality of vehicles and a present time is within a charging period in the charging plan, whether an abnormality has occurred based on a time difference between a reception time of the charging stop information and a scheduled charging end time.

9. The charging system according to claim 1, wherein the processor is configured to accept editing of the charging plan or editing of a charging parameter that constitutes the charging plan.

10. The charging system according to claim 1, wherein the processor is configured to, when the vehicle is reconnected after disconnection from a charger, reset the charging plan and then execute charging according to the charging plan.

11. The charging system according to claim 1, wherein the processor is configured to set the charging plan with priority given to any one of a fastest charging mode, a low voltage charging mode, and a variation suppression mode.

12. The charging system according to claim 1, wherein the processor is configured to display the charging plan as a list or a schedule table including a charging start time and a charging end time for each vehicle, or display the list and the schedule table on a display device so that they can be viewed simultaneously.

13. The charging system according to claim 1, wherein the processor is configured to set the charging plan in which a scheduled work time such as operation time of fixture equipment intervenes between charging periods.

14. The charging system according to claim 1, wherein the processor is configured to set the charging plan in accordance with a difference in power consumption due to a number, weight, or type of packages, a type of house in a delivery area, a skill level of a driver, a scheduled travel route, a scheduled travel distance, a scheduled travel time, the presence or absence or type of fixture equipment mounted on the vehicle, or the like.

15. A commercial vehicle connectable to the charging system according to claim 1, the commercial vehicle comprising:

a control section configured to determine whether a present time is within a charging period of the commercial vehicle in the charging plan, and execute charging control of the commercial vehicle according to a determination result.

16. The charging system according to claim 1, wherein the processor is further configured to obtain a scheduled work time included in operation plan information input by an operation manager, the scheduled work time including a time required for work related to operation preparation performed between a return time to a depot and a next scheduled departure time.

17. The charging system according to claim 16, wherein the work related to the operation preparation includes:

work whose required time is adjusted according to a number, weight, or type of packages;

work whose required time is adjusted according to a skill level of a driver;

work whose required time is adjusted according to a type of house in a delivery area; or work whose required time is adjusted according to the presence or absence of fixture equipment.

18. The charging system according to claim 16, wherein the processor is configured to set the scheduled work time as an interruption time in the charging plan, and control not to perform charging even when the vehicle and a charger are connected during the interruption time.

19. The charging system according to claim 16, wherein the charging plan includes a scheduled connection time at which the vehicle is connected to the charging system, a scheduled charging end time of the vehicle, and an interruption time, and wherein the processor is configured to reflect the scheduled work time as the interruption time in the charging plan.

* * * * *